US009035926B2

(12) United States Patent  
Cho et al.

(10) Patent No.: US 9,035,926 B2  
(45) Date of Patent: May 19, 2015

(54) NANO CRYSTAL DISPLAY

(71) Applicant: Samsung Display Co., Ltd., Yongin, Gyeonggi-Do (KR)

(72) Inventors: Se Hyoung Cho, Seoul (KR); Sunhwa Lee, Andong-si (KR); Meehye Jung, Suwon-si (KR); Yeun Tae Kim, Suwon-si (KR); Sunghwan Won, Seoul (KR); Chongchul Chai, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 284 days.

(21) Appl. No.: 13/764,926

(22) Filed: Feb. 12, 2013

(65) Prior Publication Data

US 2014/0055440 A1 Feb. 27, 2014

(30) Foreign Application Priority Data

Aug. 21, 2012 (KR) .................. 10-2012-0091492

(51) Int. Cl.  
*G06F 3/038* (2013.01)  
*G09G 5/00* (2006.01)  
*G09G 3/36* (2006.01)  
*G02F 1/1333* (2006.01)  
*G02F 1/1339* (2006.01)  
*G02F 1/1362* (2006.01)

(52) U.S. Cl.  
CPC ............... *G09G 3/36* (2013.01); *G09G 3/3648* (2013.01); *G09G 3/3677* (2013.01); *G02F 1/133377* (2013.01); *G02F 1/1339* (2013.01); *G02F 1/136204* (2013.01); *G02F 1/136209* (2013.01); *G02F 2001/133388* (2013.01); *G02F 2001/136222* (2013.01)

(58) Field of Classification Search  
CPC .............. G02F 1/133377; G02F 1/136204; G02F 1/136209; G02F 2001/133388; G09G 3/36; G09G 3/3648; G09G 3/3677  
USPC ...................... 345/87, 204, 211, 55  
See application file for complete search history.

(56) References Cited

U.S. PATENT DOCUMENTS

| 8,169,569 | B2 * | 5/2012 | Kang et al. | 349/106 |
|---|---|---|---|---|
| 2011/0310075 | A1 * | 12/2011 | Goh et al. | 345/211 |
| 2012/0062448 | A1 * | 3/2012 | Kim et al. | 345/55 |
| 2012/0086895 | A1 * | 4/2012 | Lee et al. | 349/106 |

FOREIGN PATENT DOCUMENTS

KR 1020130084842 A 7/2013

* cited by examiner

*Primary Examiner* — Viet Pham  
(74) *Attorney, Agent, or Firm* — Cantor Colburn LLP

(57) ABSTRACT

A nano crystal display includes a display panel including a display area and a non-display area, a data driver which applies data voltages to pixels through data lines, a gate driver disposed in the non-display area and which sequentially applies gate signals to the pixels through gate lines in response to control signals, a control signal line part disposed in the non-display area and which applies the control signals to the gate driver, a cover layer which extends in a column direction and covers the gate driver and the control signal line part, and a sub-electrode which extends in the column direction and covers the cover layer. The pixels display gray scales corresponding to the data voltages provided through the data lines in response to the gate signals.

20 Claims, 13 Drawing Sheets

NANO CRYSTAL DISPLAY

This application claims priority to Korean Patent Application No. 10-2012-0091492, filed on Aug. 21, 2012, and all the benefits accruing therefrom under 35 U.S.C. §119, the content of which in its entirety is herein incorporated by reference.

BACKGROUND

1. Field

The disclosure relates to a nano crystal display. More particularly, the disclosure relates to a nano crystal display, in which a control signal line part and a gate driver are protected from static electricity and moisture.

2. Description of the Related Art

In recent years, various display apparatuses, such as a liquid crystal display, an organic light emitting diode, an electrowetting display, a plasma display panel, an electrophoretic display, a nano crystal display, etc., have been developed.

In general, a display apparatus includes two substrates and an image display part interposed between the two substrates. The two substrates are coupled to each other to face each other and spaced apart from each other to interpose the image display part therebetween. When the display apparatus is manufactured, a spacer is typically provided on one of the two substrates to maintain a distance between the two substrates, and the other of the two substrates and the spacer may be attached to each other using adhesive. Due to the above-mentioned processes, a manufacturing process of the display apparatus may become substantially complicated.

SUMMARY

The disclosure provides a nano crystal display, in which a control signal line part and a gate driver are protected from static electricity and moisture.

An exemplary embodiment a nano crystal display includes a display panel that includes a display area, in which a plurality of pixels is arranged, and a non-display area, a data driver which applies data voltages to the pixels through a plurality of data lines, a gate driver disposed in the non-display area and which sequentially applies gate signals to the pixels through a plurality of gate lines in response to control signals, a control signal line part disposed in the non-display area and which applies the control signals to the gate driver, a cover layer which extends in a column direction and covers the gate driver and the control signal line part, and a sub-electrode which extends in the column direction and covers the cover layer. The pixels display grayscales corresponding to the data voltages provided through the data lines in response to the gate signals.

In an exemplary embodiment, the gate driver may include a plurality of transistors which operates based on the control signals.

In an exemplary embodiment, the display panel may include a substrate, on which the control signal line part and the transistors are disposed, and a black matrix disposed on the substrate corresponding to the non-display area and which covers the control signal line part and the transistors. The cover layer may be disposed on the black matrix and overlaps a first area, in which the transistors and the control signal line part are disposed.

In an exemplary embodiment, the sub-electrode may be upwardly spaced apart from the black matrix by a predetermined distance in the first area and contact the black matrix at left and right boundaries of the first area.

In an exemplary embodiment, the nano crystal display may further include a roof layer disposed on the black matrix and which extends in the column direction and covers the sub-electrode, and the cover layer, the sub-electrode and the roof layer may extend to upper and lower boundaries of an area, in which the gate driver is disposed, when viewed in a plan view.

In an exemplary embodiment, the nano crystal display may further include an insulating layer disposed on the black matrix, and the sub-electrode may be upwardly spaced apart from the insulating layer by a predetermined distance in the first area and contact the insulating layer at left and right boundaries of the first area.

In an exemplary embodiment, the nano crystal display may further include a bridge electrode disposed on the black matrix in the first area, the control signal line part may include a control line, and the bridge electrode may electrically connect the control line to a transistor of the transistors through a contact hole defined in the black matrix.

In an exemplary embodiment, the nano crystal display may further include a discharge line disposed on the substrate corresponding to the non-display area outside the first area, and the sub-electrode may be electrically connected to the discharge line through a contact hole formed through the black matrix.

In an exemplary embodiment, each of the pixels includes a substrate including a pixel area and a boundary area surrounding at least a portion of the pixels area, a thin film transistor disposed on the substrate, a first electrode disposed on the pixel area and connected to the thin film transistor, a second electrode extending in a row direction and upwardly spaced apart from the first electrode by a predetermined distance in the pixel area, where a tunnel shaped cavity is defined between the first electrode and the second electrode, an image display part disposed in the tunnel shaped cavity and which display an image in response to an electric field generated by the first and second electrodes, a roof layer disposed on the second electrode, and a sealing layer disposed on the roof layer and which covers the display area to seal the tunnel shaped cavity.

An exemplary embodiment of a nano crystal display includes a substrate including a display area, in which a plurality of pixels is arranged, and a non-display area adjacent to the display area, where the pixels are connected to gate lines and data lines crossing the gate lines, a gate driver disposed in the non-display area of the substrate and which sequentially applies gate signals to the pixels through a plurality of gate lines in response to control signals, a control signal line part disposed in the non-display area of the substrate and which applies the control signals to the gate driver, a sub-electrode which extends in a column direction and covers the gate driver and the control signal line part, and a roof layer which extends in the column direction and covers the sub-electrode.

In an exemplary embodiment, the pixels display grayscales corresponding to the data voltages provided through the data lines in response to the gate signals, and the sub-electrode is upwardly spaced apart from the substrate by a predetermined distance in a first area, in which the gate driver and the control signal line part are disposed, and disposed substantially close to the substrate at left and right boundaries of the first area, where a tunnel shaped cavity is between the substrate and the sub-electrode.

According to one or more exemplary embodiment, the nano crystal display protects the control signal line part and the gate driver from the static electricity and the moisture.

BRIEF DESCRIPTION OF THE DRAWINGS

The above and other features of the invention will become readily apparent by reference to the following detailed description when considered in conjunction with the accompanying drawings, in which.

DETAILED DESCRIPTION

Figure 1:
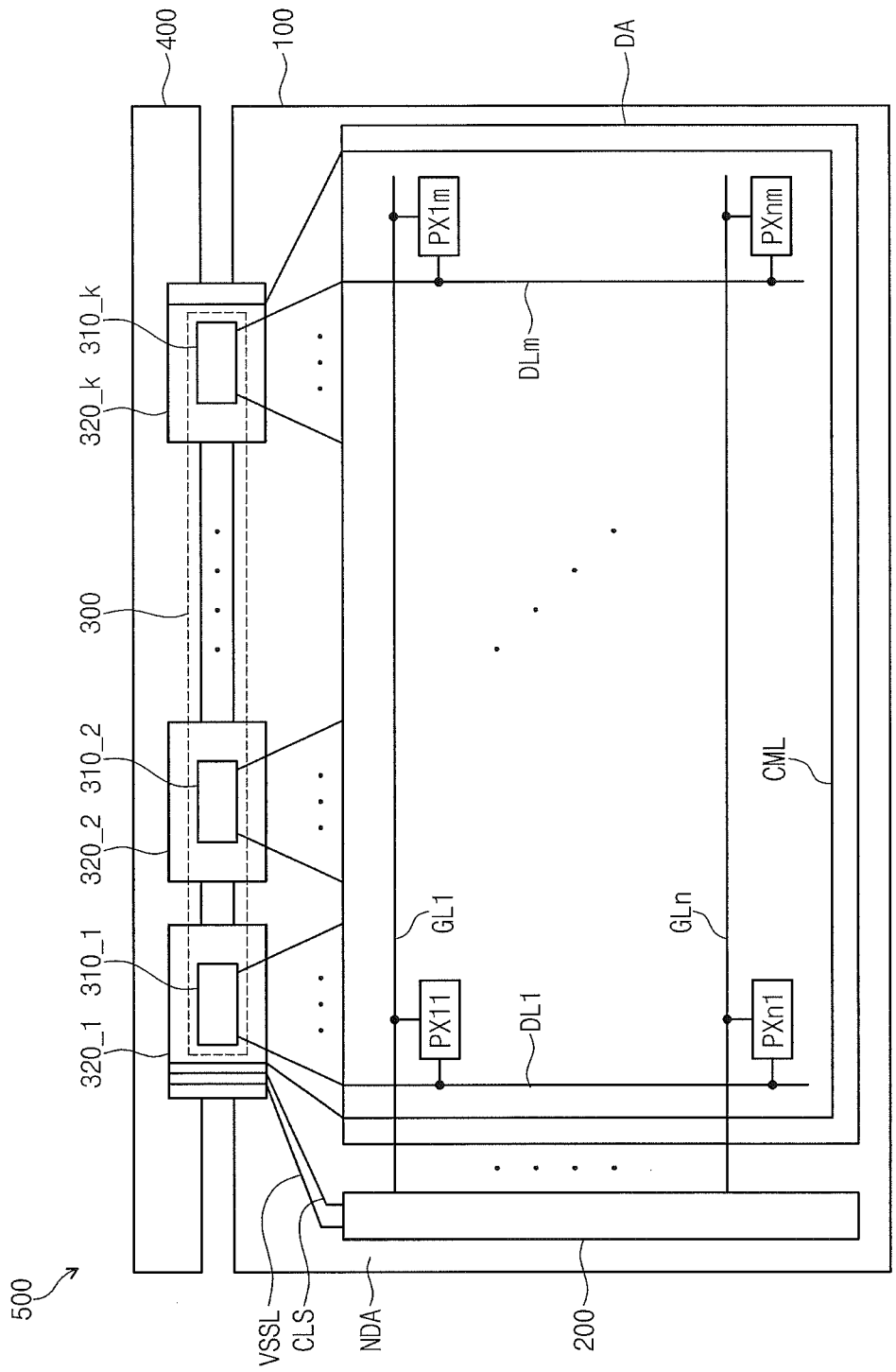
FIG. 1 is a block diagram showing an exemplary embodiment of a nano crystal display according to the invention.

The invention will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of the invention will be described in detail with reference to the accompanying drawings.

FIG. 1 is a block diagram showing a nano crystal display according to the invention.

Referring to FIG. 1, a nano crystal display 500 includes a display panel 100, a gate driver 200, a data driver 300 and a driving circuit substrate 400.

The display panel 100 includes a display area DA, in which a plurality of pixels PX11 to PXnm is arranged substantially in a matrix form, a non-display area NDA surrounding the display area DA, a plurality of gate lines GL1 to GLn, a plurality of data lines DL1 to DLm crossing the gate lines GL1 to GLn, a control signal line part CLS, an off voltage line VSSL, and a common voltage line CML.

The gate lines GL1 to GLn are connected to the gate driver 200 and receive gate signals. The data lines DL1 to DLm are connected to the data driver 300 and receive data voltages in analog form.

The pixels PX11 to PXnm are connected to the gate lines GL1 to GLn and the data lines DL1 to DLm crossing the gate lines GL1 to GLn. In an exemplary embodiment, the pixels PX11 to PXnm are arranged substantially in a matrix form having n rows by m columns. Each of the 'n' and 'm' is a natural number.

Each of the pixels PX11 to PXnm is connected to a corresponding gate of the gate lines GL1 to GLn and a corresponding data line of the data lines DL1 to DLm. Each of the pixels PX11 to PXnm receives a corresponding data voltage provided through the corresponding data line in response to a corresponding gate signal provided through the corresponding gate line, such that each of the pixels PX11 to PXnm displays a grayscale corresponding to the corresponding data voltage.

The control signal line part CLS is connected to the gate driver 200 through a first flexible printed circuit board 320_1 of a plurality of flexible printed circuit boards 320_1 to 320_k. In an exemplary embodiment, the first flexible printed circuit board 320_1 may be located at a leftmost position of the display panel 100. The control signal line part CLS receives control signals from a timing controller (not shown) disposed, e.g., mounted, on the driving circuit substrate 400. The control signals are applied to the gate driver 200 through the control signal line part CLS. The off voltage line VSSL is connected to the gate driver 200 through the first flexible printed circuit board 320_1 located at the leftmost position of the display panel 100. The off voltage line VSSL receives an off voltage from a voltage generator (not shown) disposed, e.g., mounted, on the driving circuit substrate 400. The off voltage is applied to the gate driver 200 through the off voltage line VSSL.

The gate driver 200 is disposed in the non-display area NDA adjacent to a side of the display area DA. In an exemplary embodiment, the gate driver 200 is disposed, e.g., mounted, on the non-display area NDA adjacent to a left side of the display area DA as an amorphous silicon thin film transistor ("TFT") gate driver circuit ("ASG"). In response to the control signals provided through the control signal line part CLS, the gate driver 200 sequentially applies the gate signals to the pixels PX11 to PXnm through the gate lines GL1 to GLn, and the pixels PX11 to PXnm are thereby selectively turned on row by row while being vertically scanned.

The data driver 300 receives the data signals from the timing controller and generates the analog data voltages corresponding to the data signals. The data driver 300 applies the data voltages to the pixels PX11 to PXnm through the data lines DL1 to DLm. The data driver 300 includes a plurality of source driver chips 310_1 to 310_k. Here, 'k' is natural number less than 'm.' The source driver chips 310_1 to 310_k are disposed, e.g., mounted, on the flexible printed circuit boards 320_1 to 320_k, respectively, and connected between the driving circuit substrate 400 and the non-display area NDA adjacent to an upper portion of the display area DA.

In an exemplary embodiment, as shown in FIG. 1, the source driver chips 310_1 to 310_k are disposed, e.g., mounted, on the flexible printed circuit boards 320_1 to 320_k, respectively, by a tape carrier package ("TCP") method, but not being limited thereto. In an alternative exemplary embodiment, the source driver chips 310_1 to 310_k may be disposed, e.g., mounted, on the non-display area NDA adjacent to the upper portion of the display area DA by a chip-on-glass ("COG") method.

The common voltage line CML is disposed along edges of the display area DA. The common voltage line CML includes the same material as the gate lines GL1 to GLn. The common voltage is applied to a second electrode of each pixel PX11 to PXnm, which will be described later in detail.

The display panel 100 includes a sub-electrode elongated in a column direction, and the sub-electrode covers the gate driver 200 and the control signal line part CLS. In such an embodiment, the sub-electrode protects transistors of the gate driver 200 and the control signal line part CLS from static electricity and moisture.

Figure 2:
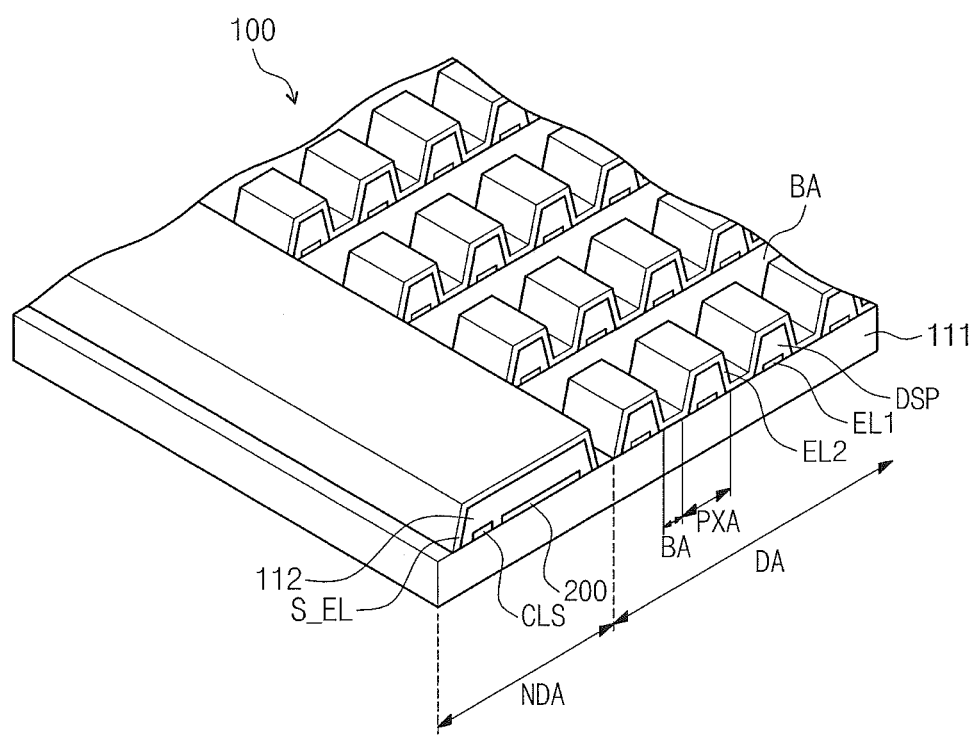
FIG. 2 is a perspective view of an exemplary embodiment of a display panel shown in FIG. 1.

FIG. 2 is a perspective view of an exemplary embodiment of the display panel shown in FIG. 1.

Referring to FIG. 2, the display panel 100 includes a substrate 111, a plurality of first electrodes EL1 disposed on the substrate 111, a plurality of second electrodes EL2 disposed on the substrate 111, the control signal line part CLS disposed on the substrate 111, the gate driver 200 disposed on the substrate 111, a cover layer 112 that covers the control signal line part CLS and the gate driver 200, and the sub-electrode S_EL that covers the cover layer 112.

The substrate 111 may be a transparent or opaque insulating substrate, e.g., a silicon substrate, a glass substrate, a plastic substrate, etc. The substrate 111 includes the display area DA and the non-display area NDA as the display panel 100.

The display area DA of the substrate 111 includes a plurality of pixel areas PXA corresponding to the pixels PX11 to PXnm, respectively, and a boundary area BA between the pixel areas PXA. The pixel areas PXA are arranged substantially in a matrix form corresponding to the matrix form of the pixels PX11 to PXnm.

The first electrodes EL1 are disposed in the pixel areas PXA to correspond to the pixels PX11 to PXnm, respectively. The second electrodes EL2 are disposed on the substrate 111 corresponding to the display area DA. The second electrodes EL2 extend in a row direction and are spaced apart from each other with a constant interval. The second electrodes EL2 extend overlapping the pixel areas PXA arranged in the row direction. The second electrodes EL2 are commonly connected to the common voltage line CML shown in FIG. 1.

The second electrodes EL2 contact the substrate 111 in the boundary area BA and upwardly spaced apart from the substrate 111 in the pixel areas PXA by a predetermined distance. Image display layers DSP are disposed between the substrate 111 and the second electrodes EL2 in the pixel areas PXA. In an alternative exemplary embodiment, a roof layer (not shown) may be disposed on the substrate 111 corresponding to the display area DA. The roof layer may extend in the row direction and cover upper surfaces of the second electrodes EL2.

The gate driver 200 and the control signal line part CLS that transmits the control signals to the gate driver 200 are disposed on the non-display area NDA of the substrate 111. The gate driver 200 and the control signal line part CLS are disposed adjacent to each other. The cover layer 112 is disposed on the substrate 111 and extends in the column direction covering the gate driver 200 and the control signal line part CLS. The sub-electrode S_EL is disposed on the non-display area of the substrate 111 and extends in the column direction covering the cover layer 112. The sub-electrode S_EL is upwardly spaced apart from the substrate 111 in the area, in which the gate driver 200 and the control signal line part CLS are disposed, and contacts the substrate 111 in left and right boundary areas of the area in which the gate driver 200 and the control signal line part CLS are disposed.

In an alternative exemplary embodiment, the roof layer (not shown) is disposed on the substrate 111 corresponding to the non-display area NDA and extends in the column direction covering the sub-electrode S_EL. The cover layer 112, the sub-electrode S_EL and the roof layer may extend along upper and lower boundaries of the area in which the gate driver 200 is disposed when viewed in a plan view. In such an embodiment, the cover layer 112, the sub-electrode S_EL and the roof layer extend along the upper and lower boundaries of the area in which the gate driver 200 is disposed, and each of the cover layer 112, the sub-electrode S_EL and the roof layer may have upper and lower edges. In an alternative exemplary embodiment, a sealing layer (not shown) is disposed on the roof layer. In such an embodiment, the sealing layer covers substantially an entire of the non-display area NDA. Accordingly, the upper and lower edges of the cover layer 112, the sub-electrode S_EL and the roof layer are sealed by the sealing layer.

As described above, in an exemplary embodiment, the control signal line part CLS and the gate driver 200 are covered by the sub-electrode S_EL, such that the control signal line part CLS and the gate driver 200 are protected from external static electricity or moisture, thereby effectively preventing the control signal line part CLS and the gate driver 200 from being damaged by external static electricity or moisture.

Figure 3:
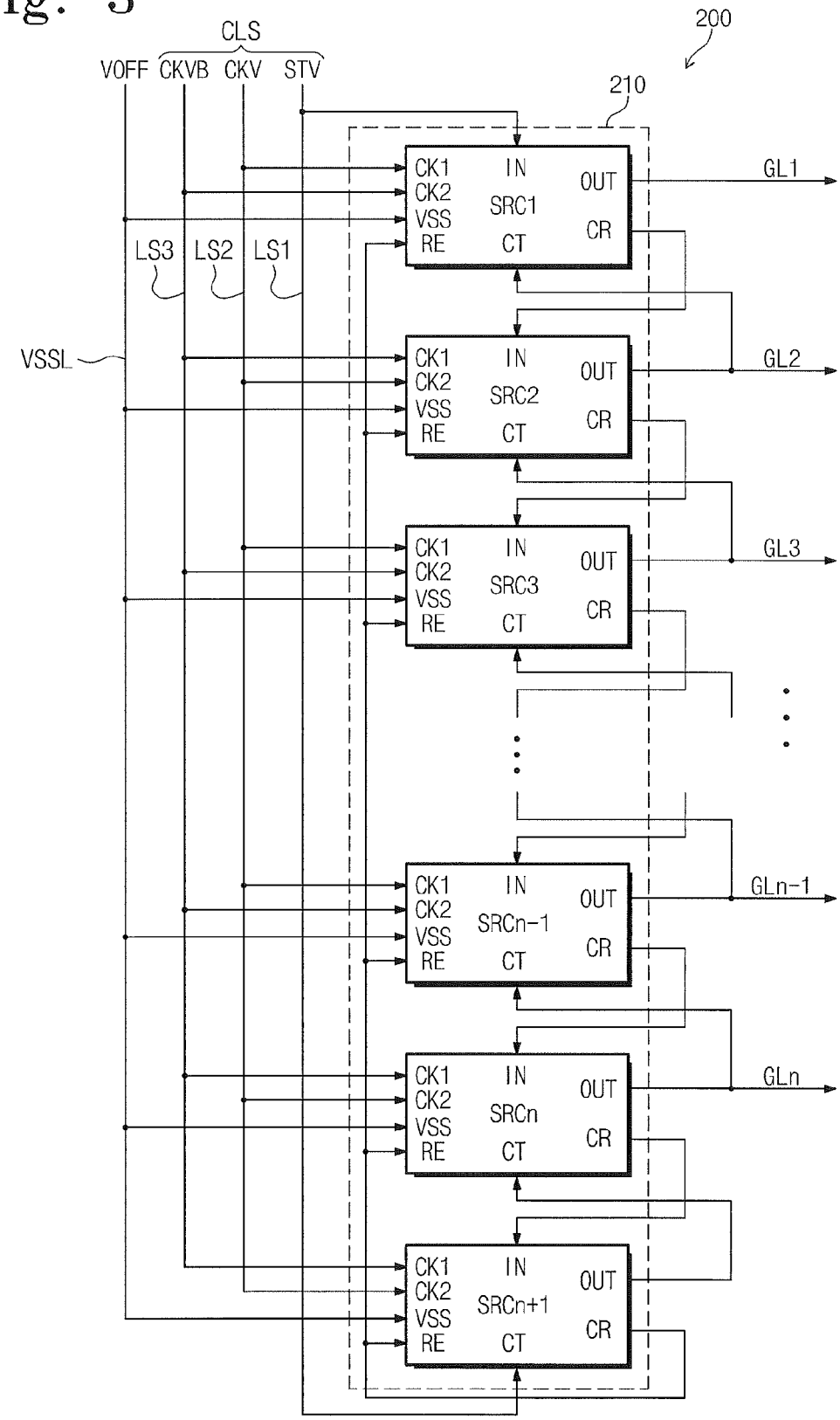
FIG. 3 is a block diagram showing an exemplary embodiment of a gate driver shown in FIG. 1.

FIG. 3 is a block diagram showing an exemplary embodiment of a gate driver shown in FIG. 1.

Referring to FIG. 3, the gate driver 200 includes a shift register 210. The shift register 210 includes first to (n+1)-th stages SRC1 to SRCn+1 connected to each other. In one exemplary embodiment, for example, the first to (n+1)-th stages are in a cascade connection, as shown in FIG. 3. The first to n-th stages SRC1 to SRCn serve as driving stages, and the (n+1)-th stage SRCn+1 serves as a dummy stage. The first to n-th stages SRC1 to SRCn are electrically connected to the first to n-th gate lines GL1 to GLn, respectively, to sequentially output the gate signals.

Each of the first to (n+1)-th stages SRC1 to SRCn+1 includes a first clock terminal CK1, a second clock terminal CK2, an off voltage terminal VSS, a reset terminal RE, a control terminal CT, a carry terminal CR, an output terminal OUT and an input terminal IN.

The first clock terminal CK1 and the second clock terminal CK2 are applied with clock signals having phases opposite to each other. In one exemplary embodiment, for example, the first clock terminals CK1 of odd-numbered stages SRC1, SRC3, ..., SRCn−1 are applied with a first clock signal CKV, and the second clock terminals CK2 of the odd-numbered stages SRC1, SRC3, ..., SRCn−1 are applied with a second clock signal CKVB having a phase opposite to a phase of the first clock signal CKV. In such an embodiment, the first clock terminals CK1 of even-numbered stages SRC2, SRC4, ..., SRCn are applied with the second clock signal CKVB and the second clock terminals CK2 of the even-numbered stages SRC2, SRC4, ..., SRCn are applied with the first clock signal CKV.

The input terminal IN of the first stage SRC1 and the control terminal CT of the dummy stage SRCn+1 are applied with a vertical start signal STV. The input terminal IN of each of second to (n+1)-th stages SRC2 to SRCn+1 is applied with a carry signal output from the carry terminal CR of a previous stage. The carry signal output from the carry terminal CR of each of the second to (n+1)-th stages SRC2 to SRCn+1 is used to drive a next stage.

The control terminal CT of each of the first to n-th stages SRC1 to SRCn is applied with the gate signal output from the output terminal OUT of the next stage. The off voltage terminal VSS of each of the first to (n+1)-th stages SRC1 to SRCn+1 is applied with an off voltage VOFF (or ground voltage). The reset terminal RE of each of the first to (n+1)-th stages SRC1 to SRCn+1 is applied with the carry signal output from the carry terminal CR of the dummy stage SRCn+1.

The first and second clock signals CKV and CKVB at a high level serve as a gate-on voltage to drive the pixels and the first and second clock signals CKV and CKVB at a low level serve as a gate-off voltage. The output terminals OUT of the first to (n+1)-th stages SRC1 to SRCn+1 output the gate signals applied to the gate lines GL1 to GLn based on the first and second clock signals CKV and CKVB, which are applied to the first and second clock terminals CK1 and CK2, respectively. In such an embodiment, the odd-numbered stages SRC1, SRC3, ..., SRCn−1 output the gate signals through the output terminals OUT thereof in response to a high level period of the first clock signal CKV and the even-numbered stages SRC2, SRC4, ..., SRCn output the gate signals through the output terminals OUT thereof in response to a high level period of the second clock signal CKVB. The carry terminal CR of each of the first to n-th stages SRC1 to SRCn outputs the carry signal.

The off voltage line VSSL is electrically connected to the off voltage terminals VSS of the first to (n+1)-th stages SRC1 to SRCn+1 and applies the off voltage VOFF to the first to (n+1)-th stages SRC1 to SRCn+1. In an exemplary embodiment, the control signal line part CLS includes a first control line LS1 that transmits the vertical start signal STV, a second control line LS2 that transmits the first clock signal CKV and a third control line LS3 that transmits the second clock signal CKVB.

The first control line LS1 is electrically connected to the input terminal IN of the first stage SRC1 and the control terminal CT of the dummy stage SRCn+1 to apply the vertical start signal STV to the first stage SRC1 and the dummy stage SRCn+1. The second control line LS2 is electrically connected to the first clock terminals CK1 of the odd-numbered stages SRC1, SRC3, ..., SRCn−1 and the second clock terminals CK2 of the even-numbered stages SRC2, SRC4, ..., SRCn and applies the first clock signal CKV to the first clock terminals CK1 of the odd-numbered stages SRC1, SRC3, ..., SRCn−1 and the second clock terminals CK2 of the even-numbered stages SRC2, SRC4, ..., SRCn. The third control line LS3 is electrically connected to the second clock terminals CK2 of the odd-numbered stages SRC1, SRC3, ..., SRCn−1 and the first clock terminals CK1 of the even-numbered stages SRC2, SRC4, ..., SRCn and applies the second clock signal CKVB to the second clock terminals CK2 of the odd-numbered stages SRC1, SRC3, ..., SRCn−1 and the first clock terminals CK1 of the even-numbered stages SRC2, SRC4, ..., SRCn.

Figure 4:
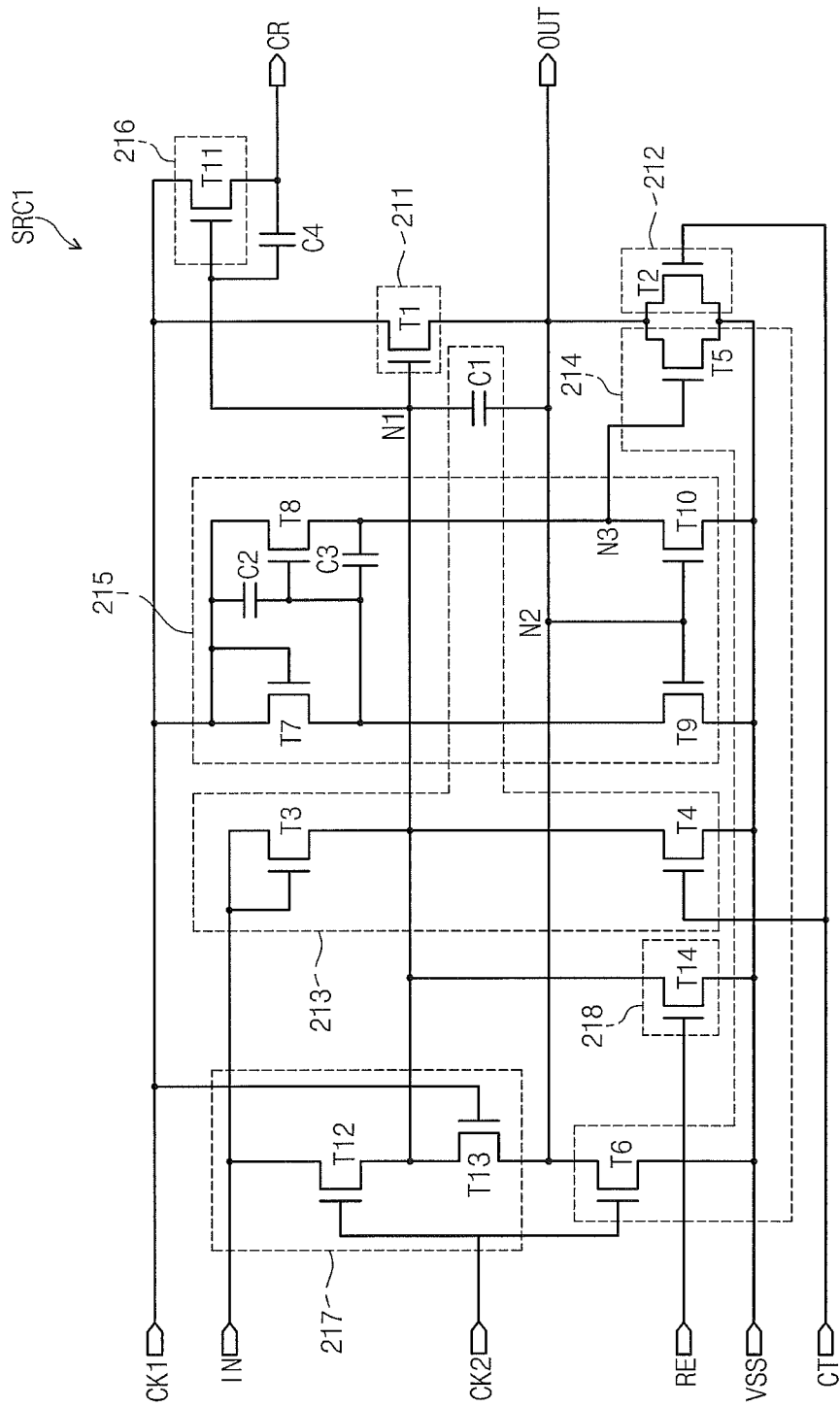
FIG. 4 is a circuit diagram showing an exemplary embodiment of a first stage shown in FIG. 3.

FIG. 4 is a circuit diagram showing an exemplary embodiment of a first stage shown in FIG. 3.

In an exemplary embodiment, the first to (n+1)-th stages SRC1 to SRCn+1 have substantially the same circuit configuration, and thus hereinafter, only the circuit configuration of the first stage SRC1 will be described for convenience of description.

Referring to FIG. 4, the first stage SRC1 includes a pull-up part 211, a pull-down part 212, a drive part 213, a hold part 214, a switch part 215 and a carry part 216. Hereinafter, the gate signals output from the first to (n+1)-th stages SRC1 to SRCn+1 will be referred to as first to (n+1)-th gate signals.

The pull-up part 211 pulls up the first clock signal CK1 provided through the first clock terminal CK1 and outputs the first clock signal CK1 as the first gate signal through the output terminal OUT. The pull-up part 211 includes a first transistor T1 including a gate electrode connected to a first node N1, a drain electrode connected to the first clock terminal CK1, and a source electrode connected to the output terminal OUT.

The control terminal CT receives the second gate signal output from the output terminal OUT of the second stage SRC2. Accordingly, the pull-down part 212 pulls down the pulled-up first gate signal to the off voltage VOFF, which is provided through the off voltage terminal VSS, in response to the second gate signal of the second stage SRC2. The pull-down part 212 includes a second transistor T2 including a gate electrode connected to the control terminal CT, a drain electrode connected to the output terminal OUT, and a source electrode connected to the off voltage terminal VSS.

The drive part 213 turns on the pull-up part 211 in response to the vertical start signal STV provided through the input terminal IN and turns off the pull-up part 211 in response to the second gate signal output from the second stage SRC2. In an exemplary embodiment, the drive part 213 includes a buffer part, a charge part and a discharge part.

The buffer part includes a third transistor T3 including gate and drain electrodes commonly connected to the input terminal IN and a source electrode connected to the first node N1. The charge part includes a first capacitor C1 including a first electrode connected to the first node N1 and a second electrode connected to a second node N2. The discharge part includes a fourth transistor T4 including a gate electrode connected to the control terminal CT, a drain electrode connected to the first node N1, and a source electrode connected to the off voltage terminal VSS.

In such an embodiment, the third transistor T3 is turned on in response to the vertical start signal STV provided through the input terminal IN, and the first capacitor C1 is thereby charged with the vertical start signal STV. When the voltage level of the first capacitor C1 charged with electric charges is higher than a threshold voltage of the first transistor T1, the first transistor T1 is turned on. The turned-on first transistor T1 outputs the first clock signal CKV provided through the first clock terminal CK1 to the output terminal OUT.

An electric potential at the first node N1 is boot-strapped by the variation of electric potential at the second node N2 due to a coupling of the first capacitor C1 according to rapid variation of the electric potential at the second node N2. Thus, the first transistor T1 effectively outputs the first clock signal CKV applied to the drain electrode thereof through the output terminal OUT.

The first clock signal CKV output through the output terminal OUT corresponds to the first gate signal applied to the first gate line GL1. The vertical start signal STV pre-charges the first transistor T1 to generate the first gate signal applied to the first gate line GL1. Then, the fourth transistor T4 is turned on in response to the second gate signal of the second stage SRC2, which is input through the control terminal CT. When the fourth transistor T4 is turned on, the electric charges charged in the first capacitor C1 is discharged at the level of the off voltage VOFF provided through the off voltage terminal VSS.

The hold part 214 includes fifth and sixth transistors T5 and T6 to hold the first gate signal to the level of the off voltage VOFF. The fifth transistor T5 includes a gate electrode connected to a third node N3, a drain electrode connected to the second node N2, and a source electrode connected to the off voltage terminal VSS. The sixth transistor T6 includes a gate electrode connected to the second clock terminal CK2, a drain electrode connected to the second node N2, and a source electrode connected to the off voltage terminal VSS.

The switching part 215 includes seventh, eighth, ninth and tenth transistors T7, T8, T9 and T10 and second and third capacitors C2 and C3, and controls the driving of the hold part 214. The seventh transistor T7 includes gate and drain electrodes connected to the first clock terminal CK1 and a source electrode connected to the third node N3 through a third capacitor C3. The eighth transistor T8 includes a drain electrode connected to the first clock terminal CK1, a gate electrode connected to the drain electrode of the eighth transistor T8 through the third capacitor C3, and a source electrode connected to the third node N3. In such an embodiment, the source electrode of the eighth transistor T8 is connected to the gate electrode of the eighth transistor T8 through the third capacitor C3. The ninth transistor T9 includes a drain electrode connected to the source electrode of the seventh transistor T7, a gate electrode connected to the second node N2, and a source electrode connected to the off voltage terminal VSS. The tenth transistor T10 includes a drain electrode connected to the third node N3, a gate electrode connected to the second node N2, and a source electrode connected to the off voltage terminal VSS.

When the clock signal at the high level is output through the output terminal OUT as the first gate signal, the electric potential at the second node N2 increases up to the high level. When the electric potential at the second node N2 is increased to the high level, the ninth and tenth transistors T9 and T10 are turned on. When the seventh and eighth transistors T7 and T8 are turned on by the first clock signal CKV applied to the first clock terminal CK1, the signal output through the seventh and eighth transistors T7 and T8 is discharged to the off voltage VOFF through the ninth and tenth transistors T9 and T10. Accordingly, the electric potential at the third node N3 is maintained at the low level while the gate signal at the high level is output, and the fifth transistor T5 is thereby maintained in the turn-off state.

Then, the first gate signal is discharged through the off voltage terminal VSS in response to the second gate signal of the second stage SRC2 input through the control terminal CT and the electric potential at the second node N2 is lowered. Thus, the ninth and tenth transistors T9 and T10 are turned off and the electric potential at the third node N3 is increased to the high level by the signal output through the seventh and eighth transistors T7 and T8. When the electric potential at the third node N3 is increased, the fifth transistor T5 is turned on and the electric potential at the second node N2 is discharged to the off voltage VOFF through the fifth transistor T5.

When the sixth transistor T6 is turned on in response to the second clock signal CKVB applied to the second clock terminal CK2, the electric potential at the second node N2 is increasingly discharged through the off voltage terminal VSS, such that the fifth and sixth transistors T5 and T6 of the hold part 214 hold the electric potential of the second node N2 to the level of the off voltage VOFF. The switch part 215 determines a turn-on timing of the fifth transistor T5.

The carry part 216 includes an eleventh transistor T11 including a drain electrode connected to the first clock terminal CK1, a gate electrode connected to the first node N1, and a source electrode connected to the carry terminal CR. The eleventh transistor T11 is turned on when the electric potential at the first node N1 is increased and outputs the first clock signal CKV applied to the drain electrode thereof through the carry terminal CR.

The first stage SRC1 further includes a ripple prevent part 217 and a reset part 218. The ripple prevent part 217 effectively prevents the first gate signal maintained in the level of the off voltage VOFF from being rippled due to noises through the input terminal N. In such an embodiment, the ripple prevent part 217 includes a twelfth transistor T12 and a thirteenth transistor T13. The twelfth transistor T12 includes a drain electrode connected to the input terminal N, a gate electrode connected to the second clock terminal CK2, and a source electrode connected to the first node N1. The thirteenth transistor T13 includes a drain electrode connected to the first node N1, a gate electrode connected to the first clock terminal CK1, and a source electrode connected to the second node N2. The reset part 218 includes a fourteenth transistor T14 including a drain electrode connected to the first node N1, a gate electrode connected to the reset terminal RE, and a source electrode connected to the off voltage terminal VSS. The fourteenth transistor T14 discharges the first node N1 to the off voltage VOFF in response to the (n+1)-th gate signal of the (n+1)-th stage SRCn+1, which is provided through the reset terminal RE. The output of the gate signal from the (n+1)-th stage SRCn+1 informs an end of one frame, such that the reset part 218 allows the first node N1 of each of the first to (n+1)-th stages SRC1 to SRCn+1 to be discharged at the end of the one frame.

In an exemplary embodiment, the fourteenth transistor T14 of the reset part 218 of each of the first to (n+1)-th stages SRC1 to SRCn+1 is turned on in response to the output signal from the (n+1)-th stage SRCn+1 after the first to n-th gate signals are sequentially output from the first to n-th stages SRC1 to SRCn. Accordingly, the first node N1 of each of the first to (n+1)-th stages SRC1 to SRCn+1 is reset to the off voltage VOFF. As a result, the first to (n+1)-th stages SRC1 to SRCn+1 of the shift register 210 are initialized and operated again.

Figure 5:
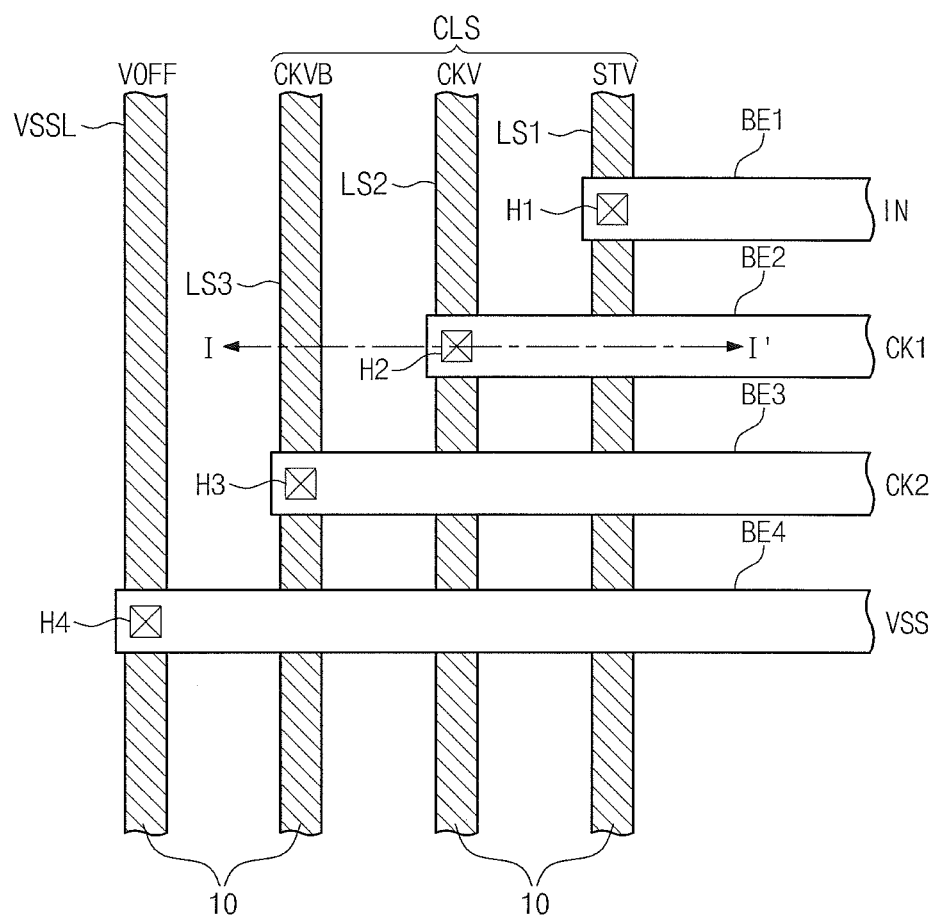
FIG. 5 is a plan view of first, second and third lines and an off voltage line shown in FIG. 4.
Figure 6:
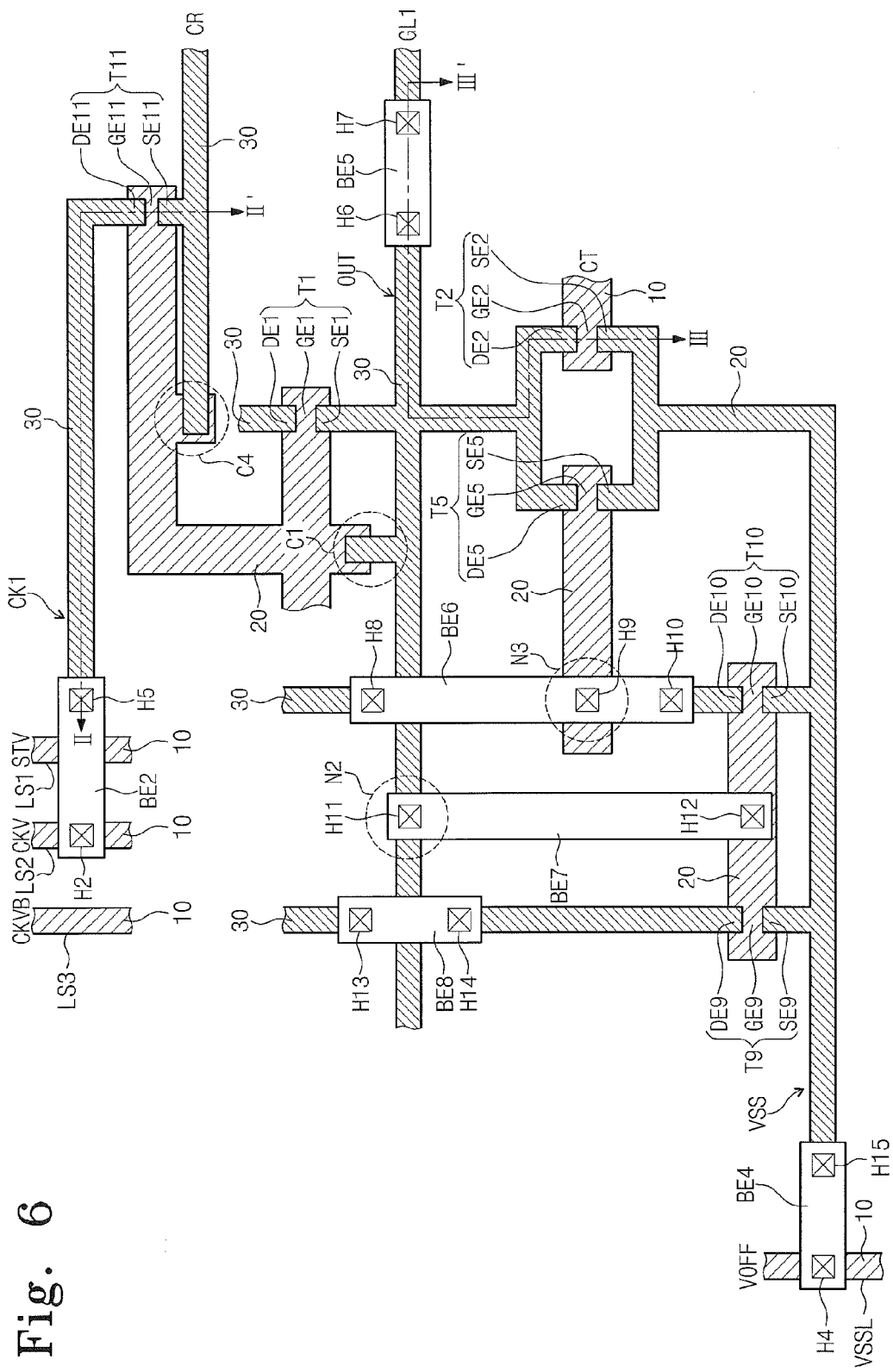
FIG. 6 is a plan view showing a portion of the circuit of the first stage shown in FIG. 4.

FIG. 5 is a top plan view showing an exemplary embodiment of the first, second and third control lines and the off voltage line shown in FIG. 4, and FIG. 6 is a top plan view showing a portion of an exemplary embodiment of the circuit of the first stage shown in FIG. 4. FIG. 6 shows first, second, fifth, ninth, tenth and eleventh transistors. Referring to FIGS. 5 and 6, the first to third control lines LS1 to LS3 and the off voltage line VSSL are configured to include first conductive patterns 10. The first conductive patterns 10 are spaced apart from each other with a constant interval and extend in the column direction. The first stage SRC1 includes second conductive patterns 20 that extend to form the gate electrodes GE1, GE2, GE5, GE9, GE10 and GE 11 of the first, second, fifth, ninth, tenth and eleventh transistors T1, T2, T5, T9, T10 and T11 and third conductive patterns 30 that extend to form the source electrodes SE1, SE2, SE5, SE9, SE10 and SE11 and the drain electrodes DE1, DE2, DE5, DE9, DE 10 and DE 11 of the first, second, fifth, ninth, tenth and eleventh transistors T1, T2, T5, T9, T10 and T11.

In an exemplary embodiment, the first conductive patterns 10 and the second conductive patterns 20 are substantially and simultaneously provided in a same layer. In such an embodiment, the third conductive patterns 30 may be provided in a different layer from the first conductive patterns 10 to be insulated from the first conductive pattern 10. The first conductive patterns 10 and the second conductive patterns 20 may be substantially and simultaneously patterned with the gate lines GL1 and GLn. The third conductive patterns 30 may be substantially and simultaneously patterned with the data lines DL1 to DLm.

The second conductive patterns 20 form the gate electrodes of the transistors of the first stage SRC1. In one exemplary embodiment, for instance, the gate electrodes GE1, GE2, GE5, GE9, GE10 and GE 11 of the first, second, fifth, ninth, tenth and eleventh transistors T1, T2, T5, T9, T10 and T11 shown in FIG. 6 are formed by the second conductive patterns 20. The second conductive patterns 20 extend in the areas, in which the gate electrodes are disposed, along the signal lines shown in FIG. 4. In one exemplary embodiment, for example, the second conductive pattern 20 that forms the gate electrode GE10 of the tenth transistor T10 extends in a horizontal direction to form the gate electrode GE9 of the ninth transistor T9. The other transistors not shown in FIG. 6 include the gate electrodes formed by the second conductive patterns 20.

The third conductive patterns 30 form the source and drain electrodes of the transistors of the first stage SRC1. In one exemplary embodiment, for example, the source electrodes SE1, SE2, SE5, SE9, SE10 and SE 11 and the drain electrodes DE1, DE2, DE5, DE9, DE 10 and DE 11 of the first, second, fifth, ninth, tenth and eleventh transistors T1, T2, T5, T9, T10 and T11 shown in FIG. 6 are formed by the third conductive patterns 30. The third conductive patterns 30 extend in the areas, in which the source and drain electrodes are disposed, along the signal lines shown in FIG. 4. In one exemplary embodiment, for example, the third conductive pattern 30 that forms the source electrode SE1 of the first transistor T1 extends to form the drain electrode DE5 of the fifth transistor T5, the drain electrode DE2 of the second transistor T2 and the output terminal OUT. The third conductive patterns 30 that form the source electrodes SE2 and SE5 of the second and fifth transistors T2 and T5 extend to form the source electrodes SE9 and SE10 of the ninth and tenth transistors T9 and T10.

The first to third control lines LS1 to LS3 and the off voltage line VSSL are connected to the transistors by first to fourth bridge electrodes BE1 to BE4 through first to fourth contact holes H1 to H4. In one exemplary embodiment, for example, the first conductive pattern 10 that forms the second control line LS2 is electrically connected to a second bridge electrode BE2 through the second contact hole H2. The second conductive pattern 20 that forms the drain electrode DE11 of the eleventh transistor T11 extends and is electrically connected to the second bridge electrode BE2 through a fifth contact hole H5. Accordingly, the second control line LS2 may be connected to the eleventh transistor T11. The gate, source and drain electrodes are electrically connected to each other by bridge electrodes. In an exemplary embodiment, the gate electrode GE5 of the fifth transistor T5 shown in FIG. 4 is connected to the drain electrode DE10 of the tenth transistor T10. In such an embodiment, as shown in FIG. 6, the gate electrode GE5 of the fifth transistor T5 extends and is electrically connected to a sixth bridge electrode BE6 through a ninth contact hole H9, and the drain electrode DE10 of the tenth transistor T10 extends to be electrically connected to the sixth bridge electrode BE6 through the tenth contact hole H10. The eighth transistor T8 shown in FIG. 4 is connected to the sixth bridge BE6 through the eighth contact hole H8.

In an exemplary embodiment, the firth to eighth bridge electrodes BE1 to BE8 may be simultaneously patterned with the first electrodes EL1 shown in FIG. 2. The bridge electrodes BE1 to BE8 may include a conductive material, which is substantially the same as a material of the first electrodes EL1.

The second conductive patterns 20 are electrically connected to the third conductive patterns 30 by the bridge electrodes. The third conductive patterns 30 are electrically connected to each other by the bridge electrodes. In an exemplary embodiment, the gate electrodes GE9 and GE10 of the ninth and tenth transistors T9 and T10 shown in FIG. 6 and the output terminal OUT are connected to the second node N2. In such an embodiment, the second conductive pattern 20 that forms the gate electrodes GE9 and GE10 of the ninth and tenth transistors T9 and T10 is electrically connected to the seventh bridge electrode BE7 through a twelfth contact hole H12. The third conductive pattern 30 that forms the output terminal OUT is electrically connected to the seventh bridge electrode BE7 through an eleventh contact hole H11.

The drain electrode of the ninth transistor T9 is connected to the source electrode of the seventh transistor T7 shown in FIG. 4 and not connected to the signal line of the output terminal OUT. In an exemplary embodiment, the third conductive pattern 30 that forms the drain electrode DE9 of the ninth transistor T9 is electrically connected to the eighth bridge electrode BE8 through a fourteenth contact hole H14. The third conductive pattern 30 that forms the source electrode of the seventh transistor T7 shown in FIG. 4 is electrically connected to the eighth bridge electrode BE8 through the thirteenth contact hole H13.

The first capacitor C1 is formed in the area, at which the second conductive pattern 20 that forms the gate electrode GE1 of the first transistor T1 and the third conductive pattern 30 that forms the source electrode SE1 of the first transistor T1 overlap each other.

The output terminal OUT is electrically connected to the fifth bridge electrode BE5 through the sixth contact hole H6. The first gate line GL1 is electrically connected to the fifth bridge electrode BE5 through the seventh contact hole H7. Therefore, the output OUT is electrically connected to the first gate line GL1.

Figure 7:
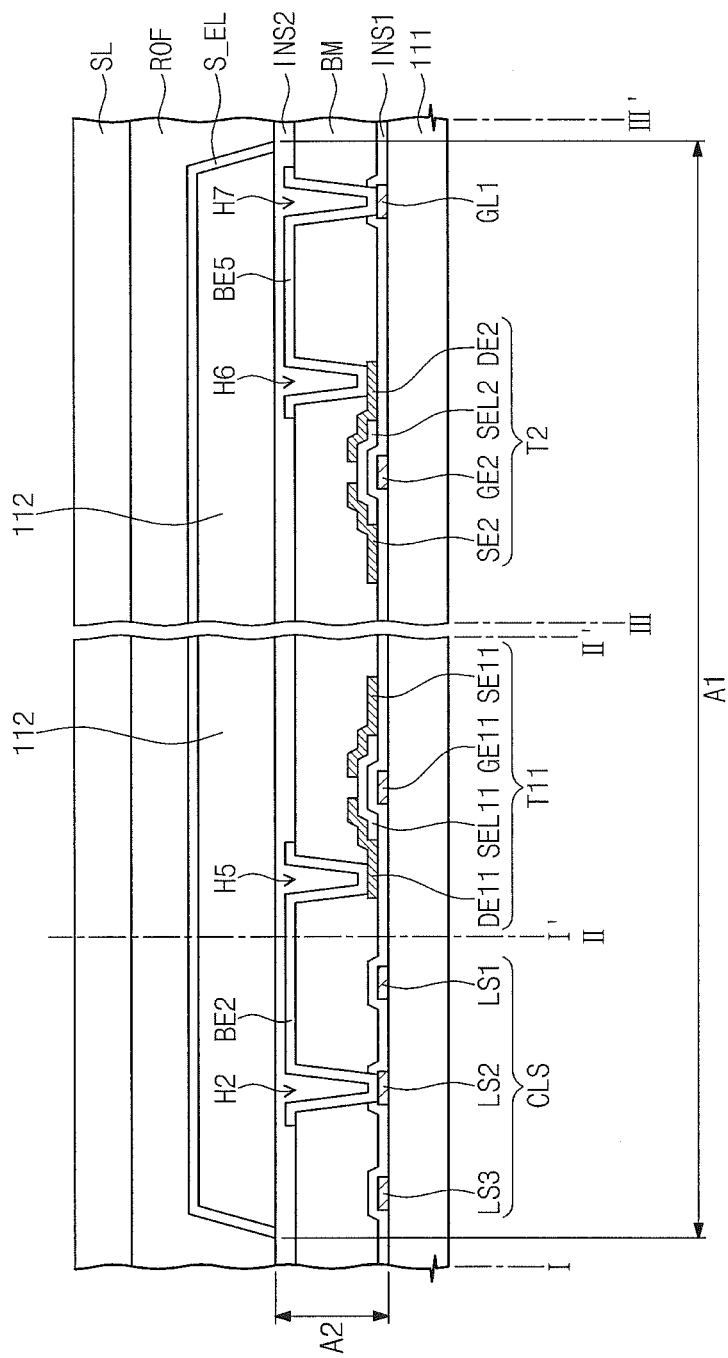
FIG. 7 is a cross-sectional view taken along line I-I' of FIG. 5 and line II-II' and line III-III' of FIG. 6.

FIG. 7 is a cross-sectional view taken along line I-I' of FIG. 5 and line II-II' and line III-III' of FIG. 6.

Referring to FIG. 7, the first to third control lines LS1 to LS3 formed by the first conductive patterns 10, the gate electrodes GE2 and GE11 of the second and eleventh transistors T2 and T11, which are formed by the second conductive patterns 20, and the first gate line GL1 are disposed on the substrate 111 to be spaced apart from each other.

A first insulating layer INS1 is disposed on the substrate 111 to cover the first to third control lines LS1 to LS3 and the gate electrodes GE2 and GE11. The first insulating layer INS1 may serve as a gate insulating layer.

A semiconductor layer SEL2 of the second transistor T2 is disposed on the first insulating layer INS1 that covers the gate electrode GE2 of the second transistor T2. The source electrode SE2 and the drain electrode DE2 of the second transistor T2 are disposed on the semiconductor layer SEL2 of the second transistor T2 and the first insulating layer INS 1 to be spaced apart from each other.

A semiconductor layer SEL11 of the eleventh transistor T11 is disposed on the first insulating layer INS1 that covers the gate electrode GE11 of the eleventh transistor T11. The source electrode SE11 and the drain electrode DE11 of the eleventh transistor T11 are disposed on the semiconductor layer SEL11 of the eleventh transistor T11 and the first insulating layer INS1 to be spaced apart from each other.

In an exemplary embodiment, each of the semiconductor layers SEL2 and SEL11 includes an active layer (not shown) and an ohmic contact layer (not shown).

A black matrix BM is disposed on the first to third control lines LS1 to LS3 and the second and eleventh transistors T2 and T11. The black matrix BM blocks light provided to the display panel 100.

In an exemplary embodiment, a protective layer (not shown) may be disposed between the black matrix BM and the second and eleventh transistors T2 and T11 to cover the second and eleventh transistors T2 and T11. The protective layer covers the semiconductor layers SEL2 and SEL11 that are exposed between the source electrode SE and the drain electrode DE of the thin film transistor TFT.

The second bridge electrode BE2 and the fifth bridge electrode BE5 are disposed on the black matrix BM. The second bridge electrode BE2 is electrically connected to the second control line LS2 through the second contact hole H2 formed through the black matrix BM and the first insulating layer INS1. The second bridge electrode BE2 is electrically connected to the drain electrode DE11 of the eleventh transistor T11 through the fifth contact hole H5 formed through the black matrix BM.

The fifth bridge electrode BE5 is connected to the drain electrode DE2 of the second transistor T2 through the sixth contact hole H6 formed through the black matrix BM. The fifth bridge electrode BE5 is electrically connected to the first gate line GL1 through the seventh contact hole H7 formed through the black matrix BM and the first insulating layer INS1. A second insulating layer INS2 is disposed on the black matrix BM to cover the fifth and sixth bridge electrodes BE5 and BE6. In an alternative exemplary embodiment, the second insulating layer INS2 may be omitted.

In the area in which the gate driver 200 is disposed, the transistors T1 to T14, the capacitors C1 to C4, and the fifth bridge electrode BE5 connected to the first gate line GL1 are disposed. Hereinafter, an area of the non-display area NDA, in which the gate driver 200 and the control signal line part CLS are disposed, will be referred to as a first area A1, and a space defined corresponding to the non-display area NDA between the upper surface of the substrate 111 and the upper surface of the second insulating layer INS2 will be referred to as a second area A2.

The cover layer 112 is disposed on the second insulating layer INS2 and extends in the column direction overlapping the first area A1 in which the first to third control lines LS1 to LS3 and the second and eleventh transistors T2 and T11 are disposed. In such an embodiment, the cover layer 112 is disposed to cover the first area A1. Accordingly, the cover layer 112 extends in the column direction to cover the gate driver 200 and the control signal line part CLS. In one exemplary embodiment, for example, the cover layer 112 may include an organic material.

The sub-electrode S_EL is disposed on the second insulating layer INS2 and extends in the column direction to cover the cover layer 112. The sub-electrode S_EL is upwardly spaced apart from the second insulating layer INS2 in the first area A1. In an exemplary embodiment, the sub-electrode S_EL is upwardly spaced apart from the area in which the gate driver 200 and the control signal line part CLS are disposed.

The sub-electrode S_EL contacts the second insulating layer INS2 at the left and right boundaries of the first area A1. That is, the sub-electrode S_EL makes contact with the second insulating layer INS2 at the left boundary of the area in which the control signal line part CLS is disposed and at the right boundary of the area in which the gate driver 200 is disposed. In an alternative exemplary embodiment, the second insulating layer INS2 may be omitted, and the sub-electrode S_EL contacts the black matrix BM at the left and right boundaries of the first area A1.

The roof layer ROF is disposed on the second insulating layer INS2 and extends in the column direction to cover the sub-electrode S_EL. In an exemplary embodiment, the cover layer 112, the sub-electrode S_EL and the roof layer ROF may extend to the upper boundary and a lower boundary of the area in which the gate driver 200 is disposed when viewed in a plan view. In such an embodiment, where the cover layer 112, the sub-electrode S_EL and the roof layer ROF extend to the upper and lower boundaries of the area, in which the gate driver 200 is disposed, the upper and lower edges are formed.

The sealing layer SL is disposed on the roof layer ROF to cover substantially the entire of the non-display area NDA. The sealing layer SL seals the cover layer 112, the sub-electrode S_EL and the roof layer ROF, which extend to the upper and lower portions of the area in which the gate driver 200 is disposed. Thus, the both edges of the cover layer 112, the sub-electrode S_EL and the roof layer ROF may be sealed by the sealing layer SL.

The control signal line part CLS and the gate driver 200 are sealed by the sub-electrode S_EL. The external static electricity is applied to the sub-electrode S_EL located at a position higher than the gate driver 200 and the control signal line part CLS in accordance with the principle of a lightning rod. In such an embodiment, the external moisture may be blocked by the sub-electrode S_EL that covers the control signal line part CLS and the gate driver 200.

In an exemplary embodiment, as described above, the nano crystal display 500 including the sub-electrode S_EL may protect the gate driver 200 and the control signal line part CLS from the external static electricity and moisture.

Figure 8:
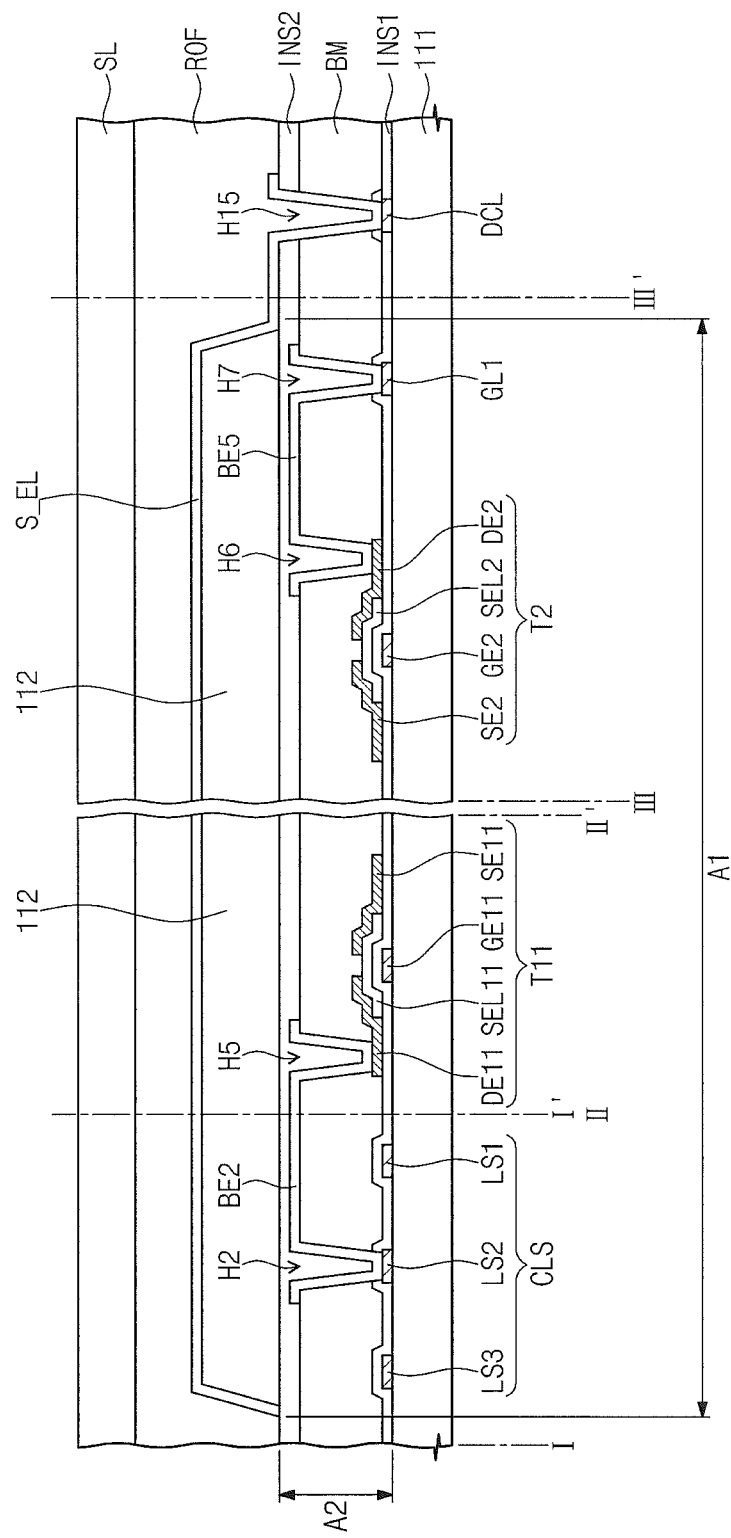
FIG. 8 is a cross-sectional view showing an alternative exemplary embodiment of a display panel.

FIG. 8 is a cross-sectional view showing an alternative exemplary embodiment of the display panel.

The display panel shown in FIG. 8 is substantially the same as the display panel shown in FIG. 7 except for a discharge line disposed on the substrate. The same or like elements shown in FIG. 8 have been labeled with the same reference characters as used above to describe the exemplary embodiment of the display panel shown in FIG. 7, and any repetitive detailed description thereof will hereinafter be omitted or simplified.

Referring to FIG. 8, in an alternative exemplary embodiment, the display panel may further include a discharge line DCL disposed on the substrate 111. The discharge line DCL is not shown in a plan view, but the discharge line DCL may be disposed in the non-display area NDA outside of the areas in which the gate driver 200, the control signal line part CLS and the off voltage line VSSL are disposed. In an exemplary embodiment, the discharge line DCL is disposed adjacent to a right side of the first area A1. In such an embodiment, as shown in FIG. 8, a fifteenth contact hole H15 is formed through the second insulating layer INS2, the black matrix BM and the first insulating layer INS1 to expose the discharge line DCL.

The sub-electrode S_EL extends to the area, in which the discharge line DCL is disposed, and is electrically connected to the discharge line DCL through the fifteenth contact hole H15. The discharge line DCL may be connected to a ground line (not shown) disposed outside of the display panel 100. Accordingly, the external static electricity applied to the sub-electrode S_EL may be discharged to the exterior of the display panel 100 through the discharge line DCL. In an exemplary embodiment, the ground line is connected to the discharge line DCL, but not being limited thereto or thereby.

In an alternative exemplary embodiment, the discharge line DCL may be applied with the off voltage VOFF (or the ground voltage) from the voltage generator.

Figure 9:
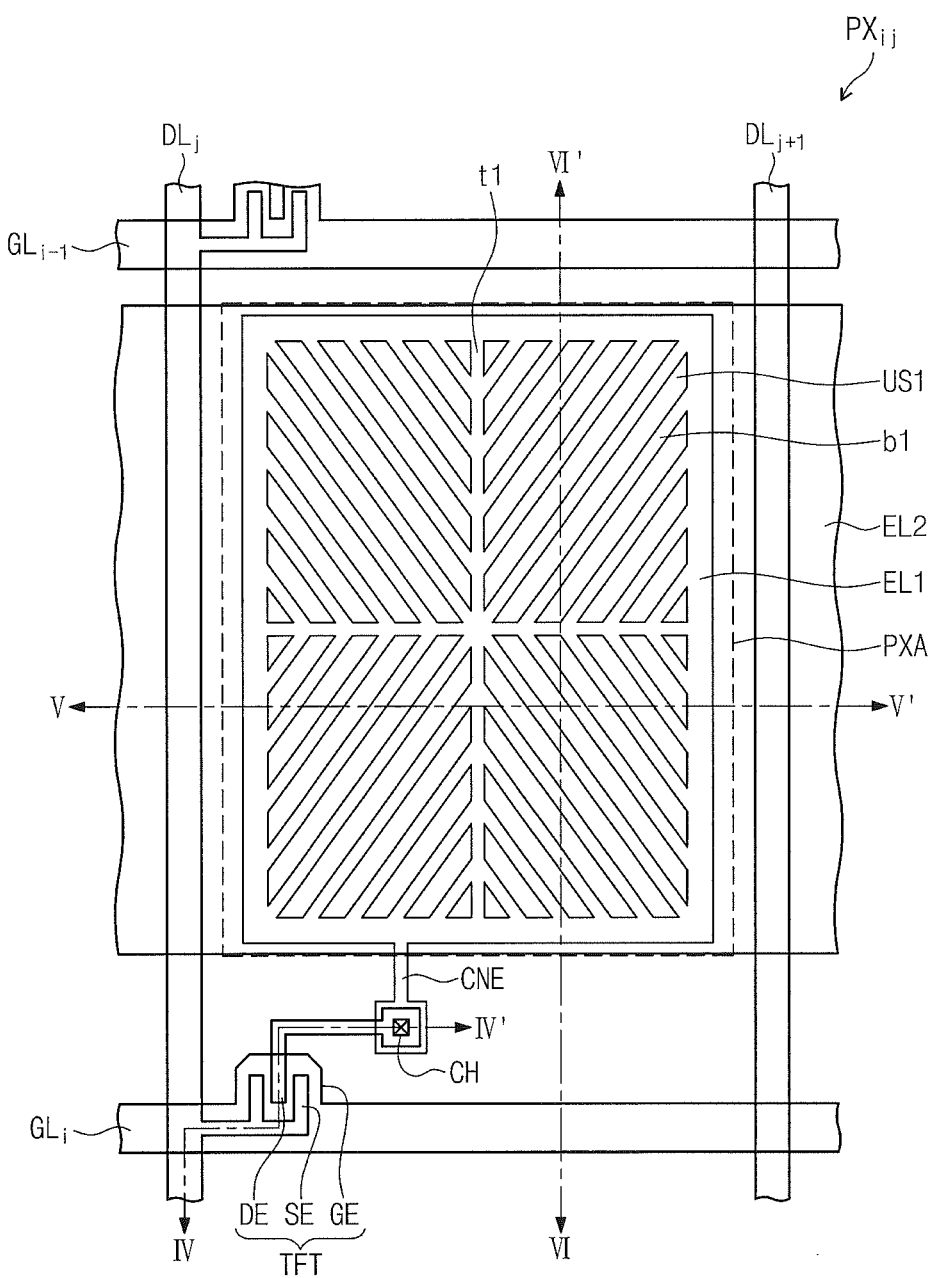
FIG. 9 is a plan view of an exemplary embodiment of a pixel shown in FIG. 1.

FIG. 9 is a plan view of an exemplary embodiment of a pixel shown in FIG. 1.

The pixels shown in FIG. 1 have substantially the same configuration as each other, for the convenience of explanation, one pixel PXij will now be described in detail with reference to FIG. 9.

Referring to FIG. 9, the gate line GLi extends in the row direction and the data line DLj extends in the column direction to cross the gate line GLi. The pixel PXij includes the thin film transistor TFT connected to the gate line GLi and the data line DLj and the first electrode EL1 connected to the thin film transistor TFT. The 'i' is a natural number equal to or less than 'n', and the 'j' is a natural number equal to or less than 'm'.

The area in which the pixel PXij is disposed includes the pixel area PXA and the boundary area BA between the pixel areas adjacent to each other, as shown in FIG. 1. The pixel area PXA displays the image and the boundary area BA blocks the light such that the image is not displayed therein. The first electrode EL1 is disposed in the pixel area PXA. The data line DLj, the gate line GLi and the thin film transistor TFT are disposed in the boundary area BA.

The thin film transistor TFT includes a gate electrode GE branched from the gate line GLi, a source electrode SE branched from the data line DLj, and a drain electrode DE connected to the first electrode EL1. The drain electrode DE is electrically connected to a connection electrode CNE branched from the first electrode EL1 through a contact hole CH.

The first electrode EL1 includes a first trunk portion t1 and a plurality of first branch portions b1 that extends from the first trunk portion t1 in a radial shape, and thus the first electrode EL1 is divided into a plurality of domains. The first trunk portion t1 may have a cross shape as shown in FIG. 9. In an exemplary embodiment, the pixel area PXA is divided into four domains by the first trunk portion t1. The first branch portions b1 extend substantially parallel to each other and spaced apart from each other in each of the domains partitioned by the first trunk portion t1. In one exemplary embodiment, for example, the first branch portions b1 are inclined at an angle of about 45 degrees with respect to the first trunk portion t1. The first branch portions b1 adjacent to each other are spaced apart from each other in micrometers to form a plurality of first micro-slits US1. Liquid crystal molecules of the liquid crystal layer (refer to FIGS. 11 and 12) are pretilted in different directions in each domain by the first micro-slits US1. The configuration of the first electrode EL1 patterned as shown in FIG. 9 is referred to as a super vertical alignment ("SVA") mode.

The first electrode EL1 includes a transparent conductive material, e.g., indium tin oxide, indium zinc oxide, indium tin zinc oxide, etc.

The second electrode EL2 extends in the row direction. The second electrode EL2 overlaps the pixel areas PXA arranged in the row direction. The second electrode EL2 receives the common voltage through the common voltage line CML. The second electrode EL2 includes a transparent conductive material, e.g., indium tin oxide, indium zinc oxide, indium tin zinc oxide, etc.

Figure 10:
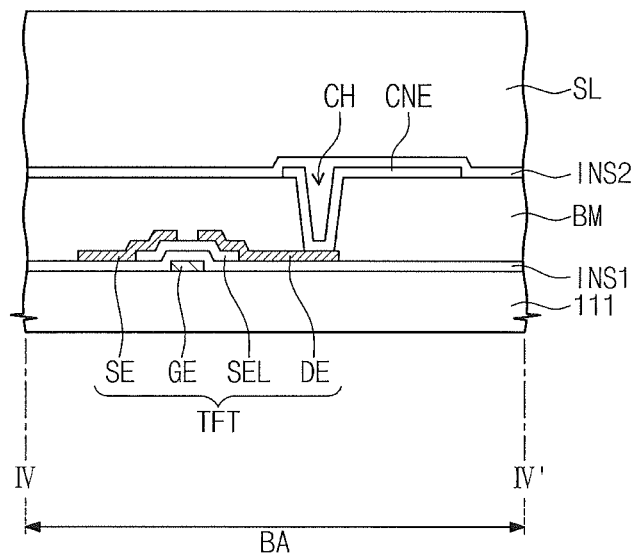
FIG. 10 is a cross-sectional view taken along line IV-IV' shown in FIG. 9.
Figure 11:
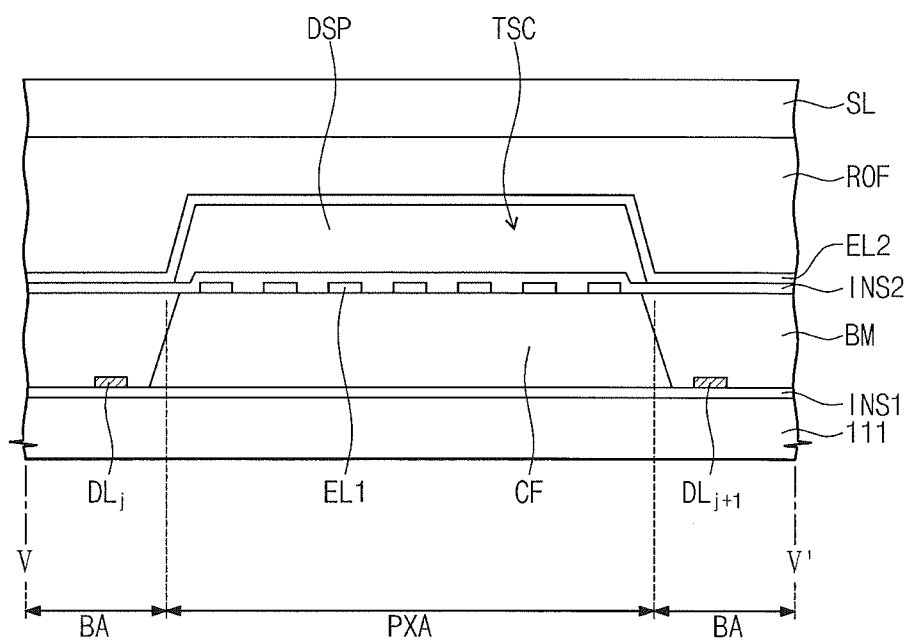
FIG. 11 is a cross-sectional view taken along line V-V' shown in FIG. 9.
Figure 12:
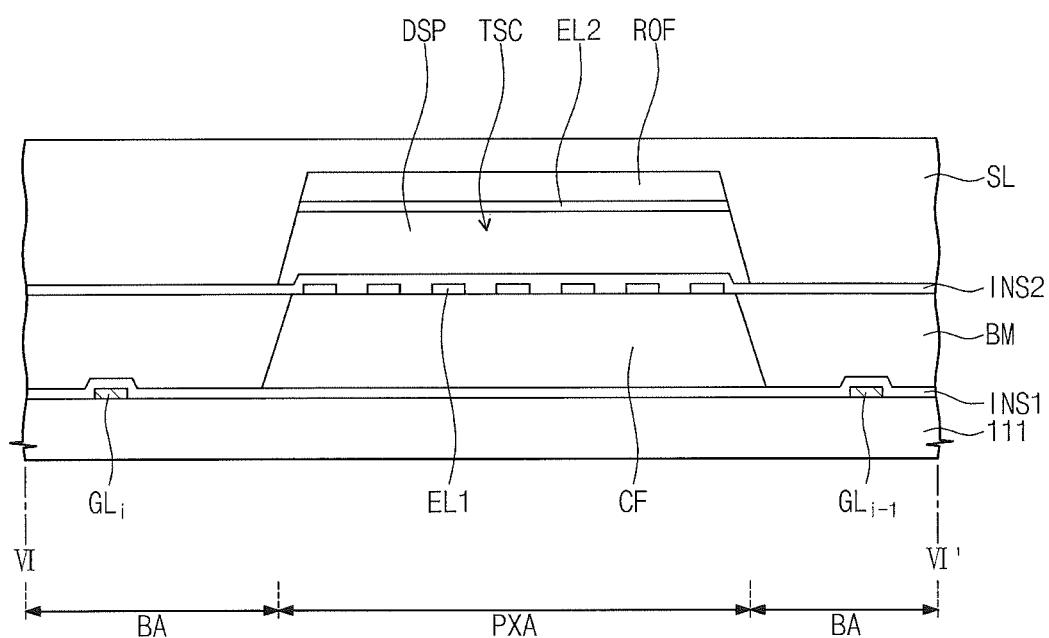
FIG. 12 is a cross-sectional view taken along line VI-VI' shown in FIG. 9.

FIG. 10 is a cross-sectional view taken along line IV-IV' shown in FIG. 9, FIG. 11 is a cross-sectional view taken along line V-V' shown in FIG. 9, and FIG. 12 is a cross-sectional view taken along line VI-VI' shown in FIG. 9.

Referring to FIGS. 10, 11, and 12, the gate lines GLi and GLi−1 are disposed on the substrate 111 and extend in the row direction. The first insulating layer INS1 is disposed on the substrate 111 to cover the gate lines GLi and GLi−1. The first insulating layer INS1 includes an insulating material. In one exemplary embodiment, for example, the first insulating layer INS1 may include silicon nitride or silicon oxide. The data lines DLj and DLj+1 are disposed on the first insulating layer INS1 and extend in the column direction to cross the gate lines GLi and GLi−1.

The thin film transistor TFT is disposed on the substrate 111 to apply the data voltage to the pixel PXij. In an exemplary embodiment, the transistors of the gate driver 200 in the non-display area NDA may be substantially simultaneously provided with the thin film transistor TFT of the display area DA. The thin film transistor TFT is connected to the gate line GLi and the data line DLj. The thin film transistor TFT includes the gate electrode GE, the semiconductor layer SEL, the source electrode SE and the drain electrode DE.

In an exemplary embodiment, the gate electrode GE branched from the gate line GLi is disposed on the substrate 111. The first insulating layer INS1 is disposed on the substrate 111 to cover the gate electrode GE. The semiconductor layer SEL is disposed on the first insulating layer INS1 to correspond to the gate electrode GE of the thin film transistor TFT. In an exemplary embodiment, the semiconductor layer SEL includes an active layer (not shown) and an ohmic contact layer (not shown). The source electrode SE and the drain electrode DE of the thin film transistor TFT are disposed on the semiconductor layer SEL of the thin film transistor TFT and the first insulating layer INS1, and spaced apart from each other. The semiconductor layer SEL serves as a conductive channel between the source electrode SE and the drain electrode DE.

A color filter CF and a black matrix BM are disposed on the thin film transistor TFT. The color filter CF is disposed in the pixel area PXA and the black matrix BM is disposed in the boundary area BA. The color filter CF and the black matrix BM overlap each other at the boundary between the pixel area PXA and the boundary area BA. In an exemplary embodiment, a protective layer (not shown) may be disposed to cover the color filter CF and the black matrix BM. The protective layer covers the upper portion of the semiconductor layer SEL that is exposed between the source electrode SE and the drain electrode DE of the thin film transistor TFT.

The color filter CF provides a color to the light passing through the pixel. The color filter CF may be a red color filter, a green color filter or a blue color filter and provided to correspond to the pixel area PXA. The color filter CF may further include a whit color filter. In the pixels shown in FIG. 1, the color filters CF having different colors may be disposed on the protective layer to allow the pixels adjacent to each other to display different colors.

The black matrix BM blocks the light passing therethrough such that the image is not displayed thereon. The black matrix BM effectively prevents light leakage that may occur by the liquid crystal molecules in edges of the image display layer or color mixture that may occur at edges of the color filters CF.

The drain electrode DE of the thin film transistor TFT is electrically connected to the connection electrode CNE branched from the second electrode EL2 through the contact hole CH formed through the black matrix BM. The first electrode EL1 is disposed on the color filter CF disposed in the pixel area PXA. The first electrode EU has the shape as shown in FIG. 9. The second insulating layer INS2 is disposed on the color filter CF and the black matrix BM to cover the first electrode EL1. In an alternative exemplary embodiment, the second insulating layer INS2 may be omitted. The second insulating layer INS2 includes an inorganic insulating material or an organic insulating material.

The second electrode EL2 that defines a tunnel shaped cavity TSC, the roof layer ROF disposed along the second electrode EL2, and the image display layer DSP disposed in the tunnel shaped cavity TSC are disposed on the second insulating layer INS2. The roof layer ROF extends in the row direction on the second insulating layer INS2.

The second electrode EL2 extends in the row direction and upwardly spaced apart from the color filter CF in the area in which the second electrode EL2 overlaps the pixel area PXA, thereby defining the tunnel shaped cavity TSC. In one exemplary embodiment, for example, the second electrode EL2 is upwardly spaced apart from the second insulating layer INS2 in the pixel area PXA to define a predetermined space. The second electrode EL2 is in direct contact with other layers along the row direction in the boundary area BA, and thus no spaces exist in the boundary area BA. In such an embodiment, the second electrode EL2 contacts the second insulating layer INS2 in the boundary area BA along the row direction. In an alternative exemplary embodiment, where the second insulating layer INS2 is omitted, the second electrode EL2 contacts the black matrix in the boundary area BA along the row direction.

The roof layer ROF extends along the direction in which the second electrode EL2 extends to cover the upper surface of the second electrode EL2. In such an embodiment, the roof layer ROF extends in the row direction as the second electrode EL2 and shared by the pixels arranged in the extending direction. Thus, the roof layer ROF may be upwardly spaced apart from the second insulating layer INS2 in the pixel area PXA.

In an exemplary embodiment, the tunnel shaped cavity TSC has the shape elongated in the column direction and both ends of the tunnel shaped cavity TSC are opened in the column direction. In such an embodiment, the upper and lower ends of the tunnel shaped cavity TSC are opened as the roof layer ROF is not formed when viewed in a plan view.

The second electrode EL2 is connected to the common voltage line CML (not shown) in the non-display area NDA. In an exemplary embodiment, the common voltage line CML may be provided together with the gate lines GLi and GLi−1. The first insulating layer INS1, the black matrix BM and the second insulating layer INS2 are sequentially stacked on the common voltage line CML. The first insulating layer INS 1, the black matrix BM and the second insulating layer INS2 are provided with an opening (not shown) formed therethrough to expose a portion of the common voltage line CML. The second electrode EL2 is electrically connected to the common voltage line CML through the opening and receives the common voltage from the common voltage line CML.

The image display layer DSP is disposed in the tunnel shaped cavity TSC. In an exemplary embodiment, the image display layer DSP is disposed between the first electrode EL1 and the second electrode EL2, which face each other. In an exemplary embodiment, the image display layer DSP may be a liquid crystal display.

When the gate signal is applied to the gate line GLi, the thin film transistor TFT is turned on. The data voltage applied to the data line DLj is applied to the first electrode EL1 through the turned-on thin film transistor TFT. The second electrode EL2 is applied with the common voltage. Accordingly, an electric field is generated between the first electrode EL1 and the second electrode EL2. Due to the electric field generated by a difference between the voltage applied to the first electrode EL1 and the voltage applied to the second electrode EL2, the liquid crystal molecules are aligned. As a result, an amount of the light passing through the liquid crystal layer is controlled, and thus desired predetermined image is displayed.

In an exemplary embodiment, an additional inorganic insulating layer (not shown) may be disposed between the second electrode EL2 and the roof layer ROF. The inorganic insulating layer may include silicon nitride or silicon oxide. The inorganic insulating layer supports the roof layer ROF such that the roof layer ROF substantially maintains the tunnel shaped cavity TSC.

The sealing layer SL is disposed on the roof layer ROF. The sealing layer SL covers the pixel area PXA and the boundary area BA. The sealing layer SL blocks the both ends of the tunnel shaped cavity to seal the tunnel shaped cavity.

Figure 13:
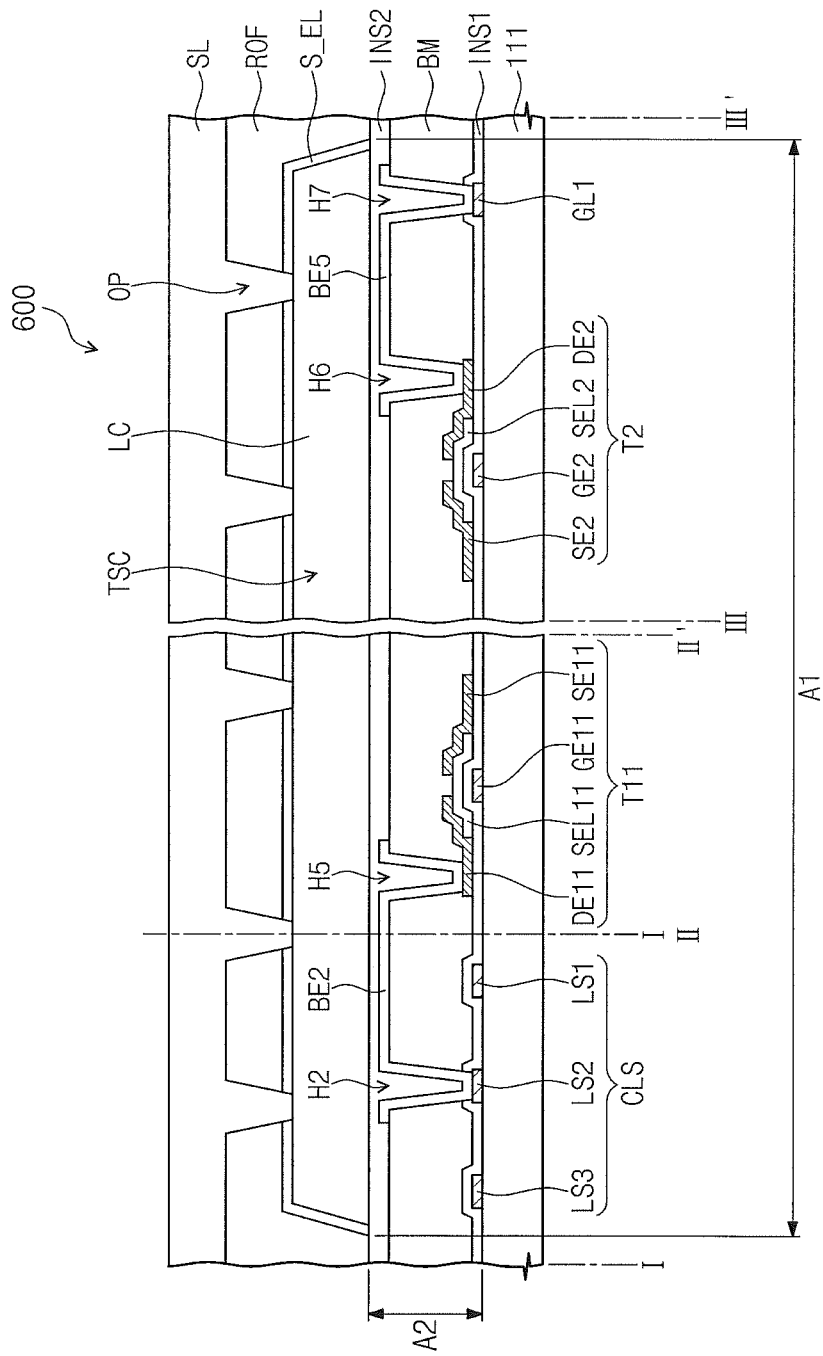
FIG. 13 is a cross-sectional view showing an alternative exemplary embodiment of a nano crystal display according to the invention.

FIG. 13 is a cross-sectional view showing an alternative exemplary embodiment of a nano crystal display according to the invention.

The nano crystal display 600 shown in FIG. 13 is substantially the same as the nano crystal display shown in FIG. 7 except for the roof layer and the sub-electrode. The same or like elements shown in FIG. 13 have been labeled with the same reference characters as used above to describe the exemplary embodiment of the nano crystal display shown in FIG. 7, and any repetitive detailed description thereof will hereinafter be omitted or simplified.

Referring to FIG. 13, the sub-electrode S_EL and the roof layer ROF include a plurality of openings OP. The roof layer ROF is patterned to have the openings OP. In an exemplary embodiment, the roof layer ROF in the non-display area NDA is patterned together with the roof layer ROF in the display area DA when the roof layer ROF in the display area DA is patterned to have the shape elongated in the row direction.

In an exemplary embodiment, the sub-electrode S_EL is patterned to have the openings OP located at positions respectively corresponding to the openings OP of the roof layer ROF. The sub-electrode S_EL in the non-display area NDA is patterned to have the openings OP together with the second electrode EL2 in the display area DA when the second electrode EL2 in the display area DA is patterned to have the shape elongated in the row direction.

In an exemplary embodiment, the cover layer 112 may be removed by a wet etch. In such an embodiment, the area from which the cover layer 112 is removed may be defined as the tunnel shaped cavity TSC as described above. The liquid crystal layer LC is provided in the tunnel shaped cavity TSC in the non-display area NDA. In such an embodiment, as the definition of the tunnel shaped cavity TSC of the pixel PXij, the sub-electrode S_EL may be disposed on the second insulating layer INS2 of the non-display area NDA to define a second tunnel shaped cavity TSC. The sub-electrode S_EL extends in the row direction. The sub-electrode S_EL is upwardly spaced apart from the second insulating layer INS2 in the first area A1 of the non-display area NDA and contacts the second insulating layer INS2 at the left and right boundaries of the first area A1 to define the tunnel shaped cavity TSC. In an exemplary embodiment, where the second insulating layer INS2 is omitted, the sub-electrode S_EL may contact the black matrix BM at the left and right boundaries of the first area A1.

The roof layer ROF is disposed on the second insulating layer INS2 and extends in the column direction to the sub-electrode S_EL. The roof layer ROF is upwardly spaced apart from the second insulating layer INS2 in the first area A1. The roof layer ROF, which extends in the column direction to cover the sub-electrode S_EL, contacts the second insulating layer INS2 in the area except for the first area A1. In an exemplary embodiment, where the second insulating layer INS2 is omitted, the roof layer ROF is upwardly spaced apart from the black matrix BM in the first area A1. In such an embodiment, the roof layer ROF contacts the black matrix BM except for the first area A1.

The sub-electrode S_EL and the roof layer ROF extend to the upper and lower boundaries of the area, in which the gate driver 200 is disposed, when viewed in a plan view. In an exemplary embodiment, the tunnel shaped cavity TSC of the non-display area NDA has the shape elongated to the column direction and the both ends of the tunnel shaped cavity TSC are opened. In such an embodiment, when viewed in a plan view, the upper and lower ends of the tunnel shaped cavity TSC are opened as the roof layer ROF is not disposed at the upper and lower ends of the tunnel shaped cavity TSC.

The sealing layer SL is disposed on the roof layer ROF. The sealing layer SL covers the entire of the non-display area NDA. Thus, the sealing layer SL blocks the opened both ends of the tunnel shaped cavity TSC to seal the tunnel shaped cavity TSC.

In an exemplary embodiment, the common voltage and the data voltage are not applied to the non-display area NDA, and the liquid crystal layer LC is thereby not operated. In such an embodiment, the non-display area NDA does not display the image as the black matrix BM blocks the light traveling to the non-display area NDA.

In an exemplary embodiment, where the sealing layer SL is formed by a deposition method, the sealing layer SL may be provided in the openings OP. In an alternative exemplary embodiment, the sealing layer SL may be provided by a film attaching method, and the openings OP may be maintained in the empty state.

In an alternative exemplary embodiment, no liquid crystal layer LC may be provided in the tunnel shaped cavity TSC. In such an embodiment, the tunnel shaped cavity TSC may be filled with the sealing layer SL formed by the deposition method. In an exemplary embodiment, where the sealing layer SL is provided by the film attaching method, the openings OP and the tunnel shaped cavity TSC are maintained in the empty state.

The control signal line part CLS and the gate driver 200 are sealed by the sub-electrode S_EL. In such an embodiment, the external static electricity and moisture are blocked by the sub-electrode S_EL that covers the control signal line part CLS and the gate driver 200.

In an exemplary embodiment, as described above, the nano crystal display 600 may protect the gate driver 200 and the control signal line part CLS from the external static electricity and moisture.

Figure 14:
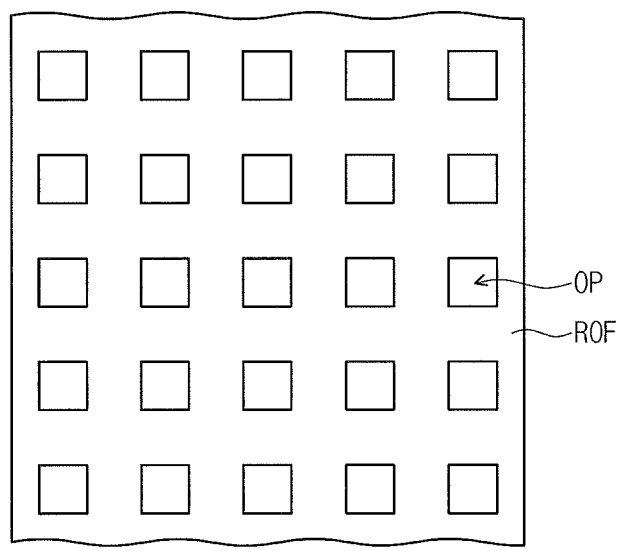
FIGS. 14 and 15 are plan views of exemplary embodiments of openings shown in FIG. 13.
Figure 15:
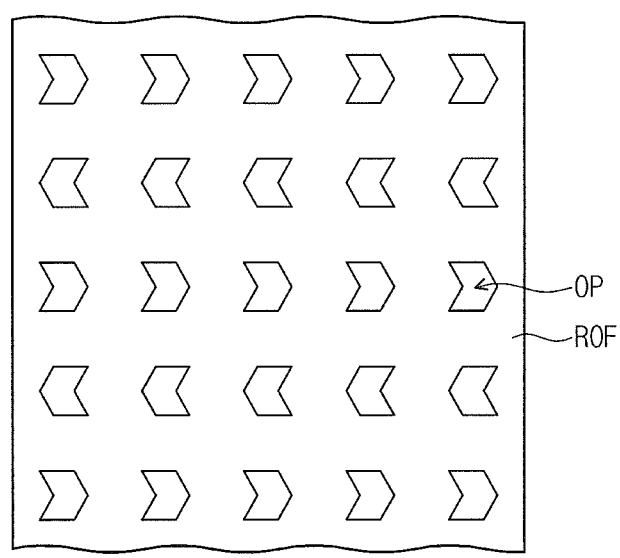

FIGS. 14 and 15 are plan views showing exemplary embodiments of the openings shown in FIG. 13.

Referring to FIGS. 14 and 15, the openings OP may be arranged substantially in a matrix form. In an exemplary embodiment, each of the openings OP may have a rectangular shape. In an alternative exemplary, each of the openings OP may have a shape, in which upper and lower surfaces face each other, are substantially parallel to each other and remaining surfaces are bent to a same direction at a predetermined angle. However, the shape of the openings OP should not be limited thereto or thereby.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A nano crystal display comprising:
   a display panel comprising a display area, in which a plurality of pixels is arranged, and a non-display area;
   a data driver which applies data voltages to the pixels through a plurality of data lines;
   a gate driver disposed in the non-display area and which sequentially applies gate signals to the pixels through a plurality of gate lines in response to control signals;
   a control signal line part disposed in the non-display area and which applies the control signals to the gate driver;
   a cover layer which extends in a column direction and covers the gate driver and the control signal line part; and
   a sub-electrode which extends in the column direction and covers the cover layer,
   wherein the pixels display grayscales corresponding to the data voltages provided through the data lines in response to the gate signals.

2. The nano crystal display of claim 1, wherein the gate driver comprises a plurality of transistors which operates based on the control signals.

3. The nano crystal display of claim 2, wherein the display panel further comprises:
   a substrate, on which the control signal line part and the transistors are disposed; and
   a black matrix disposed on the substrate corresponding to the non-display area and which covers the control signal line part and the transistors, and
   the cover layer is disposed on the black matrix overlapping a first area of the substrate in which the transistors and the control signal line part are disposed.

4. The nano crystal display of claim 3, wherein the sub-electrode is upwardly spaced apart from the black matrix by a predetermined distance in the first area and contacts the black matrix at left and right boundaries of the first area.

5. The nano crystal display of claim 3, further comprising:
   a roof layer disposed on the black matrix and which extends in the column direction and covers the sub-electrode.

6. The nano crystal display of claim 5, wherein each of the cover layer, the sub-electrode and the roof layer extends to upper and lower boundaries of an area, in which the gate driver is disposed, when viewed in a plan view.

7. The nano crystal display of claim 5, further comprising:
   a sealing layer disposed on the roof layer and which covers the non-display area.

8. The nano crystal display of claim 3, further comprising:
   an insulating layer disposed on the black matrix,
   wherein the sub-electrode is upwardly spaced apart from the insulating layer by a predetermined distance in the first area and contacts the insulating layer at left and right boundaries of the first area.

9. The nano crystal display of claim 3, further comprising:
   a bridge electrode disposed on the black matrix in the first area.

10. The nano crystal display of claim 9, wherein
    the control signal line part comprises:
    a control line; and
    the bridge electrode electrically connects the control line to a transistor of the transistors through a contact hole defined in the black matrix.

11. The nano crystal display of claim 3, further comprising:
    a discharge line disposed on the substrate corresponding to the non-display area outside the first area,
    wherein the sub-electrode is electrically connected to the discharge line through a contact hole defined in the black matrix.

12. The nano crystal display of claim 11, wherein the discharge line is applied with a ground voltage.

13. The nano crystal display of claim 1, wherein each of the pixels comprises:
    a substrate including a pixel area and a boundary area surrounding at least a portion of the pixel area;
    a thin film transistor disposed on the substrate;
    a first electrode disposed on the pixel area and connected to the thin film transistor;
    a second electrode extending in a row direction and upwardly spaced apart from the first electrode by a predetermined distance in the pixel area, wherein a tunnel shaped cavity is defined between the first electrode and the second electrode;
    an image display part disposed in the tunnel shaped cavity and which displays an image in response to an electric field generated by the first and second electrodes;
    a roof layer disposed on the second electrode; and
    a sealing layer disposed on the roof layer and which covers the display area to seal the tunnel shaped cavity.

14. The nano crystal display of claim 13, wherein the image display part is a liquid crystal layer.

15. The nano crystal display of claim 13, wherein the first electrode comprises:
    a first trunk portion having a cross shape;
    a plurality of branch portions extending from the first trunk portion in a radial shape; and
    a plurality of micro-slits defined between the branch portions.

16. A nano crystal display comprising:
    a substrate including a display area, in which a plurality of pixels is arranged, and a non-display area adjacent to the display area, wherein the pixels are connected to a plurality of gate lines and a plurality of data lines crossing the gate lines;
    a gate driver disposed in the non-display area of the substrate and which sequentially applies gate signals to the pixels through the gate lines in response to control signals;
    a control signal line part disposed in the non-display area of the substrate and which applies the control signals to the gate driver;
    a sub-electrode which extends in a column direction and covers the gate driver and the control signal line part; and
    a roof layer which extends in the column direction and covers the sub-electrode,
    wherein the pixels display grayscales corresponding to data voltages provided through the data lines in response to the gate signals, and
    the sub-electrode is upwardly spaced apart from the substrate by a predetermined distance in a first area of the substrate, in which the gate driver and the control signal line part are disposed,
    wherein the sub-electrode is disposed substantially close to the substrate at left and right boundaries of the first area, and
    a tunnel shaped cavity is defined between the substrate and the sub-electrode.

17. The nano crystal display of claim 16, further comprising:
    a black matrix disposed on the substrate; and
    a sealing layer disposed on the roof layer and which covers the non-display area,
    wherein the gate driver comprises a plurality of transistors which operates based on the control signals,
    the black matrix covers the control signal line part and the transistors of the gate driver, and the sub-electrode is upwardly spaced apart from the black matrix in the first area and contacts the black matrix at the left and right boundaries of the first area such that the tunnel shaped cavity is defined between the black matrix and the sub-electrode.

18. The nano crystal display of claim 16, wherein a plurality of openings is defined in each of the sub-electrode and the roof layer.

19. The nano crystal display of claim 18, further comprising:
a liquid crystal layer disposed in the tunnel shaped cavity.

20. The nano crystal display of claim 18, further comprising:
a sealing layer disposed on the roof layer and which covers the non-display area,
wherein the sealing layer is disposed in the openings and the tunnel shaped cavity.

* * * * *